US008871356B2

(12) United States Patent
Ogilvy et al.

(10) Patent No.: US 8,871,356 B2
(45) Date of Patent: Oct. 28, 2014

(54) BRAZING PIECE, A METHOD OF MAKING A BRAZING PIECE, AND A METHOD OF BRAZING AND COMPONENTS MADE FROM SAID BRAZING PIECE

(75) Inventors: Andrew Josef Widawski Ogilvy, Port Talbot (GB); Douglas Kenneth Hawksworth, Oakville (CA); Elisabeth Abom, Linkoping (SE)

(73) Assignees: Sandvik Osprey Limited, Neath (GB); Sapa Heat Transfer AB, Finspång (SE)

( * ) Notice: Subject to any disclaimer, the term of this patent is extended or adjusted under 35 U.S.C. 154(b) by 1143 days.

(21) Appl. No.: 12/595,942

(22) PCT Filed: Mar. 14, 2008

(86) PCT No.: PCT/GB2008/000883
§ 371 (c)(1),
(2), (4) Date: Apr. 22, 2010

(87) PCT Pub. No.: WO2008/110808
PCT Pub. Date: Sep. 18, 2008

(65) Prior Publication Data
US 2010/0206529 A1    Aug. 19, 2010

(30) Foreign Application Priority Data

Mar. 14, 2007 (GB) .................................. 0704926.5

(51) Int. Cl.
*B23K 35/36* (2006.01)
*B23K 35/28* (2006.01)
*C23C 4/12* (2006.01)
*C22C 32/00* (2006.01)
*C22C 1/10* (2006.01)
*B23K 35/02* (2006.01)

(52) U.S. Cl.
CPC .............. *C23C 4/121* (2013.01); *B23K 35/0244* (2013.01); *B23K 35/0238* (2013.01); *B23K 35/3605* (2013.01); *B23K 35/286* (2013.01); *B23K 35/02* (2013.01); *C22C 32/0089* (2013.01); *C22C 1/1042* (2013.01)
USPC ........... 428/565; 428/654; 428/552; 228/261; 228/224

(58) Field of Classification Search
None
See application file for complete search history.

(56) References Cited

U.S. PATENT DOCUMENTS 3,667,111 A    6/1972 Chartet
5,330,090 A *  7/1994 Iwai .............................. 228/56.3

(Continued)

FOREIGN PATENT DOCUMENTS

CN     1531072 A    9/2004
EP     0 202 008    11/1986

(Continued)

OTHER PUBLICATIONS

"Composite Deposition (CD) Technology—A Novel Joining Process for Automotive Heat Exchangers", Paper 35, T&N Symposium 1995, Field, Crafts, Hawksworth, 7 pages.

(Continued)

*Primary Examiner* — Mark Ruthkosky
*Assistant Examiner* — Daniel J Schleis
(74) *Attorney, Agent, or Firm* — Morgan, Lewis & Bockius LLP

(57) ABSTRACT

The invention relates to a self-fluxing brazing piece. The piece comprises a composite material comprising at least one inorganic material distributed in a metal or metal alloy matrix, the inorganic material forming a flux during brazing to promote the formation of a thermally induced metallic bond. The matrix may be an aluminum silicon brazing alloy and the inorganic material may be a potassium-fluoro-aluminate flux. The piece is made by spray forming.

90 Claims, 13 Drawing Sheets

(56) References Cited

U.S. PATENT DOCUMENTS

| | | | |
|---|---|---|---|
| 5,418,072 A | 5/1995 | Baldantoni et al. | |
| 5,547,517 A | 8/1996 | Iwai | |
| 5,594,930 A | 1/1997 | Terada et al. | |
| 5,749,938 A | 5/1998 | Coombs | |
| 6,164,517 A * | 12/2000 | Kim | 228/56.3 |
| 6,317,913 B1 | 11/2001 | Kilmer et al. | |
| 6,997,371 B2 * | 2/2006 | Shabtay | 228/183 |
| 2003/0207148 A1 | 11/2003 | Gillispie et al. | |
| 2004/0157001 A1 * | 8/2004 | Grinberg et al. | 427/455 |
| 2007/0029370 A1 | 2/2007 | Zhao et al. | |
| 2010/0330386 A1 | 12/2010 | Schmitt et al. | |

FOREIGN PATENT DOCUMENTS

| | | | |
|---|---|---|---|
| EP | 0 552 567 A1 | | 7/1993 |
| EP | 0 697 266 A1 | | 2/1996 |
| EP | 0574458 B1 | | 8/1997 |
| EP | 0682578 B1 | | 4/2000 |
| FR | 2 855 085 | | 11/2004 |
| GB | 646377 | | 11/1950 |
| GB | 1300252 | | 12/1972 |
| GB | 1 438 955 | | 6/1976 |
| JP | 05305492 | * | 11/1993 |
| JP | 05305492 A | | 11/1993 |
| JP | 6-315791 | | 11/1994 |
| JP | 7-1185 | | 1/1995 |
| JP | 11-170089 | | 6/1999 |
| WO | 8905870 A1 | | 6/1989 |
| WO | WO 92/15721 | | 9/1992 |
| WO | WO 94/17941 | | 8/1994 |
| WO | WO 00/52228 | | 9/2000 |
| WO | WO 01/05552 A1 | | 1/2001 |
| WO | WO 2005/123309 A1 | | 12/2005 |

OTHER PUBLICATIONS

Search Report for Great Britain Patent Application No. GB0704926.5, dated Jul. 4, 2007.
Notice of the First Office Action (and English translation) for Chinese Patent Application No. 200880008343.5, dated Jun. 17, 2011.
Notification on Result of Substantive Examination (and English translation) for Vietnamese Patent Application No. 12009-02174, dated Feb. 16, 2012.
English translation of Notice of the Second Office Action for Chinese Patent Application No. 200880008343.5, dated Apr. 5, 2012.
Office Action for Mexican Patent Application No. 38917, dated Apr. 27, 2012.
M. Courbiere et al.; "*Spray cast Al-Si base alloys for stiffness and fatigue strength requirements*," Journal de Physique IV, Colloque C7, supplement au Journal de Physique III, vol. 3, Nov. 1993, pp. 207-213.
P. Bridot, et al.; "*High stiffness and fatigue strength Al—Si—Fe base alliloys produced by the osprey route*," J. Wood, Ed.,Spray forming 2: Proceedings of the Second International Conference on Spray Forming: Swansea, U.K. (ICSF 2), Sep. 13-15, 1993; pp. 377-383.
A. Lawley, et al.; "*Spray Forming*," ASM Handbook, Powder Metal Technologies and Applications, 1998, vol. 7, pp. 396-407.
"*Introduction to Thermal Spray Processing*," Handbook of Thermal Spray Technology (#06994G); ASM Internaitonal (2004) pp. 3-13.
J. Shifan, et al.; "*The Spray Atomized and Deposited Superalloys*," Proceedings of the 3rd international Conference on Spray Forming, Cardiff (UK), 1996, pp. 61-69.
F-L. Toma, et al.; "*Comparative Study of the Electrical Properties and Characteristics of Thermally Sprayed Alumina and Spinel Coatings*," Journal of Thermal Spray Technology, vol. 20(1-2) Jan. 2011, pp. 195-205.
Spray Forming of Aluminium-Alloy Products: Part One, from Key to Metals database, Aug. 2008, pp. 1-4.
K.M. Chang, et al.; "*Spray-Formed High-Strength Superalloys*," Proceedings of the Sixth International Symposium on Superalloys sponsored by the High Temperature Alloys Committee of the Metallurgical Society, Seven Springs Mountain Resort, Champion, Pennsylvania, Sep. 18-22, 1988, pp. 485-493.
W. Hunt, Jr.; "*New Directions in Aluminum-Based P/M Materials for Automotive Applications*," SAE 2000 World Congress, Detroit, MI, Mar. 6-9, 2000, pp. 1-8.
E.S. Lee, et al.; "*Development of High Performance High Speed Steels by Spray Casting*," Third Pacific Rim International Conference on Advanced Materials and Processing (PRICM 3), 1998, pp. 1,662-1,669.
I. Schruff, et al.; "*Spray forming—The New Technology for the Production of High-Grade Tool Steels*," SDMA 2003/ICSF V, Bremen, Germany, 2003, pp. 5-11 to 5-25.
A. Cabral, et al.; "*Evaluation of Spray Formed Nickel Base Superalloys for Gas Turbine Engine Components*," United Technologies/Pratt & Whitney pp. 1-11.
H. Müller, et al.; "*Spray-formed Copper Alloys—Process and Industrial Applications*," ERZMETALL 56 (2003) Nr. 11, pp. 643-702.
T. Eden; "*Aluminum Alloys Produced by Spray Metal Forming*," Industrial Heating, Jan. 2000, pp. 45-48.
H. Lippard, et al.; "*Characterization and Thermomechanical Processing of Sprayformed Alloy 720*," TMS Superalloys, 9th International Symposium, 2000, pp. 151-157.
Thermal Spray Coatings: Part One, from Key to Metals database, Nov. 2008, pp. 1-3.
Third Party Observations in European Patent Application No. 08718725.8, dated Jan. 20, 2014.
A. Leatham et al., Osprey Process production flexibility in materials manufacture, *Metals and Materials*, Mar. 1989, pp. 140-143.
A. Lawley et al., Spray Forming in *ASM Handbook, vol. 7, Powder Metallurgy Technologies and Applications*, pp. 396-407 (1989).
Hogg et al., An Investigation of Novel Spraycast Al—Mg—Li—Zr—(Sc) Alloys, *Mat. Sci. Forum*, 519-521 (2006), pp. 1629-1634.
Meng et al., Influence of Gas Temperature on Microstructure and Properties of Cold Spray 304SS Coating, *J. Mater. Sci. Technol.*, 27(9), 809-815 (2011).
Sofyan et al., Characteristics of Cold Spray Aluminium Coating on ZE41A-T5 Magnesium, AA7075 Aluminium Alloys and 4130 Steel Substrates, *Proc. Int. Conf. Materials and Metallurgical Tech. 2009*, ITS Surabaya, Indonesia, Jun. 24-25, 2009, 5 pages.
Morgan et al., Cold Gas Dynamic Manufacturing—A new approach to Near-Net Shape Metal Component Fabrication, *Mat. Res. Soc. Symp. Proc.*, vol. 758, pp. 73-84 (2003).
Zhao et al., Coating Deposition by the Kinetic Spray Process, *Surface & Coatings Technology*, 200 (2006) pp. 4746-4754.
Papyrin, *Cold Spray: State of the Art and Applications*, European Summer University, ENISE, St-Etienne, France, Sep. 11-15, 2006, 21 pages.
Fiedler et al., The Spray Forming of Superalloys, *Journal of Metals*, vol. 39, No. 8, Aug. 1987, pp. 28-33.
Courbiere et al., Spray cast Al—Si base alloys for stiffness and fatigue strength requirements, *Journal de Physique IV, Colloque C7, supplement au Journal de Physique 111*, vol. 3, Nov. 1993. pp. 207-213.
Alcoa Aluminum Powder Brochure [Online], Alcoa Corporation [retrieved Mar. 2014] Retrieved from the Internet www.alcoa com/primary-metals/catalog/Alcoa_AP_brochure.pdf, 8 pages.
ASM Handbook article *Introduction to Thermal Spray Processing*, ASM International (www.asminternational.org) (2004) 12 pages.
Nature of Thermal Sprayed Coatings [Online], Surface Engineering Forum [retrieved Mar. 2014] Retrieved from the internet www.gordonengland.co.uk/tsc.htm, 8 pages.
Connolly et al., Mechanical and precorroded fatigue properties of coated aluminium aircraft skin system as a function of various thermal spray processes, *Corrosion Engineering, Science and Technology*, Jun. 2004, 39:2 pp. 137-142.
Sakata et al., Development of Nanoporous Alumina Catalyst Support by Anodic Oxidation of Thermally and Kinetically Sprayed Aluminum Coatings, *J. of Thermal Spray Technology*, vol. 22 (2-3), Mar. 2013, pp. 138-144.
Sturgeon et al., Development of HVOF Sprayed Aluminum Alloy Engine Bearings, in *Thermal Spray 2003: Advancing the Science and Applying the Technology* (ASM International) (May 2003) 5 pages.

\* cited by examiner a)

b)

c)

BRAZING PIECE, A METHOD OF MAKING A BRAZING PIECE, AND A METHOD OF BRAZING AND COMPONENTS MADE FROM SAID BRAZING PIECE

CROSS REFERENCE TO RELATED APPLICATIONS

This application is a 35 U.S.C. §371 National Phase Application from PCT/GB2008/000883, filed Mar. 14, 2008, and designating the United States, which claims the benefit of Great Britain Patent Application No. 0704926.5, filed Mar. 14, 2007.

The invention relates to a brazing piece, a method of making a brazing piece and a method of brazing as well as components made from said brazing pieces.

Brazing is a thermally induced metallic bonding process that occurs below the melting point of the metals to be joined with the introduction between them in the joint of a lower melting point filler alloy. The process involves a number of metallurgical and chemical processes that take place both on the surface and within the materials. For example, good wetting and spreading of the molten filler metal on the surface are necessary and determine whether capillary action will occur. Capillary flow is the dominant physical principle that ensures a good braze in a properly spaced joint, provided molten filler metal wets both surfaces that are to be joined. Capillary flow is affected by the presence of oxide films, surface roughness and the condition and properties of the brazing atmosphere Brazing of aluminium and its alloys is particularly difficult because an oxide film forms on the surface when exposed to air. The barrier action of the oxide film on aluminium hinders wetting and inhibits capillary flow. To enable intimate contact between the molten filler metal and the base metal it is necessary to disrupt the oxide, for example through the use of an inorganic salt that acts as a flux. An inert brazing atmosphere free from oxygen and water vapour is necessary to prevent re-oxidation of the molten filler metal and oxidation of the flux itself. This is achieved by brazing under nitrogen or by using a vacuum.

One field where brazing of aluminium parts is employed is in the manufacture of heat exchangers, for example, for use as automotive radiators, condensers, evaporators, oil coolers, charge air coolers and fuel coolers, and stationary heat exchangers.

GB1438955 discloses a method of brazing aluminium, which is marketed by the patentee as the Nocolok (Trade Mark) process. An aluminium sheet to be brazed has surface filler metal cladding on one or both faces. The core is unalloyed aluminium and the surface cladding is an aluminium silicon eutectic alloy. Aluminium 12 wt % silicon is a eutectic alloy with a melting point of 577° C. The melting point of unalloyed aluminium is significantly higher at 660° C. The surface layer therefore forms a hard solder or filler metal by means of which components made from such brazing sheet may be joined together. In the brazing operation, two such components are put in contact and subjected to a temperature at which the surface layer is melted without melting the core. A flux is needed, and GB1438955 discloses taking a mixture of potassium fluoride (KF) and aluminium fluoride ($AlF_3$) powder finer than 75 microns. To prepare for brazing, this material is slurried with water and applied to the surfaces to be brazed Brazing is then conducted in a brazing furnace at a temperature of about 600° C. The filler metal and flux melt and a good brazed joint can be made.

In commercial use, brazing using this technique is carried out under an inert atmosphere of nitrogen through a continuous tunnel furnace.

A disadvantage of this approach is the time taken and length of line required. It takes time to apply and dry the flux slurry and indeed much of the processing line may be taken up with these two stages alone. Also, because of the manner of applying the flux, the amount of flux per unit area may vary among batches of products and it is also difficult to ensure the flux penetrates into places which may be difficult to access. An insufficient quantity of flux will result in imperfect brazing, while too great an amount of flux will not only increase processing costs but can also result in problems such as residual flux at the brazed joint, which impairs the appearance of the joint and may interfere with any subsequent surface processing. Generally, however, it is necessary overall to use excess flux to ensure all areas are brazed successfully. There is also the problem of pollution of the brazing furnace by excess flux which drips from the pieces to be brazed. Moreover, not all components of a heat exchanger need to be clad with a brazing alloy. For example, a radiator is commonly built up by clad tubes and unclad fins. When fluxing the radiator using a slurry prior to brazing in a furnace all surfaces become covered with a flux, not only the braze clad surfaces. This gives an unnecessarily large flux consumption.

An approach used by Sandvik Osprey has been to eliminate the need for an aluminium brazing sheet which has surface cladding through the use of particle technology. Thus, in their International Patent Application No. WO94/17941 a method of producing powder material coated with flux is disclosed. In their earlier International Patent Application No. WO92/15721, spray forming using two or three sprays is disclosed in which each of the sprays uses the same molten metal alloy feed material. In WO94/17941, one spray is of aluminium silicon alloy and another spray is a one to one mixture of potassium fluoride and aluminium fluoride particles. The particles contact atomised alloy droplets and melt to form a coating or partial coating on the alloy droplets, solidifying as coated powder and therefore providing a relative intimate mixture of alloy and flux although a proportion of flux particles and solidified alloy droplets remain as separate particles as there is no contact during flight and such separate particles of flux are not melted during flight and collection.

In order to braze with this material, an unclad aluminium piece can be used, to which the powder is applied in a carrier medium containing a binder to adhere the powder in the desired position or positions. At the brazing temperature, the aluminium silicon eutectic powder melts and the coating acts as a flux to disrupt the oxide layer on the unclad aluminium piece enabling intimate contact with the molten eutectic so that a brazed joint can be formed.

The biggest disadvantage to this technique is the need to remove the binder prior to the onset of melting of both the flux and filler metal. Failure to do so results in a poorly formed brazed joint. In the case of heat exchangers, because of their nature, the heat exchangers have contained internal surfaces which cannot be brazed easily by the particle and binder system, as binder decomposition products cannot be vented off and removed.

While this coated powder method eliminates the need to produce aluminium strip clad with a lower melting point aluminium silicon brazing alloy, additional processing steps are still required to coat the aluminium parts to be brazed with the flux coated powder. It can be difficult to apply the powder uniformly to the parts to be brazed. The process of applying the powder to the brazed joints can pose a health hazard. The powder can also make it difficult to accurately locate the position of parts to be joined, such as aluminium heat exchanger tubes and cooling fins, due to the space taken up by the powder.

There are several approaches to producing brazing products by mixing powders together. For example, in EP552567 there is a return to an arrangement in which a core sheet has surface cladding. The material forming the cladding is referred to in the patent application as a "brazing agent". To form the agent, a mixture of different powders is blended. The powders are: an aluminium powder of 99.5% purity, a silicon powder, a zinc powder, a tin powder, an indium powder and a fluoride flux powder being a eutectic composition of KF and $AlF_3$. The metal based powders have an average diameter of 44 microns or less in size whilst the flux powders have an average diameter of 30 microns. After mixing, the powders are placed in a vacuum at 500° C. in order to degas the powders by removing moisture and hydrogen. Subsequently the batch of powder is heated to 480° C. and subjected to the hot pressing process. The resulting block is then hot extruded at 500° C. The patent application describes good results for brazeability being achieved with a silicon powder content of 5 or 10 wt % and a flux content of 5, 8 or 10 wt %. Brazeability is tested in the patent application by setting a test piece on a support plate formed of JIS-A3003 aluminium alloy and heating to 600 to 620° C. for ten minutes in nitrogen gas. No additional flux was added.

FR2855085 also discloses hot isostatic pressing of a mixture of powder, in this case 10 wt % cryolite flux with a particle size of between 1 micron and 10 microns, the remainder being a mixture consisting of 98 wt % zinc and 2 wt % aluminium both in a particle size of between 50 and 300 microns. The mixed powder is hot pressed at 350° C. to a pressure of 1200 bars for three hours. In the claims of the application it suggests that the resulting bar can be worked for example by being rolled.

U.S. Pat. No. 6,164,517 discloses the production of a seamless, ring-shaped brazing material. A powder of a filler alloy, Al 10 wt % Si is taken and mixed with $AlF_3$ powder and KF powder in the proportion 80:20 alloy powder to flux forming material powder. The mixed powder is pressed at room temperature and then heated to 400° C. in a reducing atmosphere burner and hot extruded to form a pipe. The pipe is then sliced to provide seamless, ring-shaped brazing pieces of 1.6 mm in width.

Mixing metal and flux powders together with subsequent consolidation has several inherent disadvantages. These include:—

(i) the powders mixed together in aforementioned disclosures are of different mean sizes, size distributions or specific gravities which, as it is well documented in the art of powder metallurgy, makes it very difficult to successfully provide a uniform mix without some segregation of the different composition powders; moreover, the distribution of the flux in the compacted state will be limited by the size of the metal powders used.

(ii) Milling is sometimes used to overcome the problems inherent in mixing powders together, however, this has other significant disadvantages in that oxide pick-up is very excessive and milling aluminium based powders can be extremely hazardous. Additionally, mechanical working of flux can lead to degradation of the flux.

(iii) Aluminium is an extremely reactive metal and such powder during the extensive time required for its production and processing will inevitably form an oxide film on its surface. Where powder is subsequently consolidated for example by hot pressing or hot isostatically pressed (HIP), this oxide will be incorporated into the final product. This increases the requirement for flux in the final brazing operation or reduces the wetting activity of the final product for a given flux content. Note, Pechiney, in their publication in the $2^{nd}$ Int Conf on Spray Forming, 1993—"High stiffness and fatigue strength Al—Si—Fe base alloys produced by the Osprey route", indicate oxygen contents for a spray formed product of 140 ppm versus 1200 ppm for the identical alloy manufactured in a powder form and 5 ppm for a similar direct chill (DC) cast alloy.

(iv) The oxide (together with the need for extra flux) as mentioned in U.S. Pat. No. 6,164,517, makes the product more brittle, which reduces the scope for subsequent mechanical working.

(v) Aluminium powder is also prone to pick up of moisture and hydrogen and consequently this is the reason why prolonged degassing of a mixed and canned powder is required prior to consolidation by hot pressing or hipping.

(vi) The many process operations required in powder production and subsequent degassing and consolidation make such processes complex, costly, highly energy demanding and therefore uncompetitive and environmentally unattractive.

(vii) In the case where elemental powders are used, for example EP552567 mentioned above, the size of the silicon particles will remain substantively similar to the added powder size (ie 40 micron) in the brazing sheet In order to overcome several of the problems associated with powder mixing and consolidation and to provide a more economic method of manufacture, a technique is described in lapsed Patent JP7001185 in which a molten aluminium silicon alloy is allowed to solidify to a semi-molten state upon which flux powder is added, the semi-molten mixture stirred and subsequently allowed to cool and solidify. Whilst such an approach may represent an improvement in some aspects over powder mixing and consolidation techniques, the solidified product will exhibit the characteristics' typical of a cast and relatively slowly solidified product. For example, the primary solidified Si phase will be relatively coarse, partially acicular in form and macro-segregated, all detrimental features to subsequent hot workability. Furthermore, the flux powder which will melt on being added to the semi-molten aluminium silicon alloy will try to separate from the aluminium silicon alloy due to its insolubility, immiscibility and density difference and such separation will lead to coarsening of the brittle flux phase during slow solidification, again imparting poor hot workability characteristics to the product. Additionally achieving a homogeneous mixture will be very difficult. Whilst stirring of the semi-molten metal will help somewhat, it is well documented that molten alloy stirring (i.e. in rheocasting and thixoforming processes) is limited to a certain volume fraction of molten alloy below which stirring becomes extremely difficult as the viscosity of the melt increases. Stirring can also result in oxide incorporation in the product.

According to one aspect of the present invention there is provided a self fluxing brazing piece, the piece comprising a spray formed composite material comprising at least one inorganic material distributed in a metal or metal alloy matrix, the inorganic material or inorganic materials forming a flux during brazing to promote the formation of a thermally induced metallic bond.

It is believed that, during brazing, the inorganic material is liberated from within the composite material advantageously facilitating the disruption of the surface oxide from the oxide-metal interface, and that the molten filler metal then envelopes the fragmented oxide promoting the rapid formation of a thermally induced metallic bond between adjacent touching surfaces The oxygen content of the matrix is preferably no more than 350 ppm or suitably no more than 250 ppm by weight. Preferably further the oxygen content of the matrix is no more than 100 ppm, more preferably it may even be less than 50 ppm. The overall oxygen content of the piece substantially depends on that contained in the inorganic material prior to its introduction into the matrix. Importantly, the overall oxygen content will be substantially less than that made by mixing metal powders with an inorganic material due to the high inherent surface area of metal powders particularly when they contain reactive elements such as aluminium. The low overall oxygen content also substantially reduces the requirement for inorganic material and these two factors greatly enhance the ductility of the composite material rendering it easier to hot or cold work.

The metal or metal alloy may be any suitable metal or metal alloy but in a preferred embodiment is aluminium or aluminium alloy. The matrix is preferably a brazing alloy and may have aluminium as one major constituent and silicon may be another major constituent. The silicon content may be 5 to 15 wt % and or may be 6 or 6.8 to 13 wt % or may be 10 to 12 wt %, or may be 11 to 12 wt %. Aluminium silicon alloy forms a eutectic within this range and consequently has a reduced melting temperature. Other suitable ranges are Al 6.8 to 8.2 wt % Si (AA4343), Al 9 to 11 wt % Si (AA4045) and Al 11 to 13 wt % Si (AA4047). Other alloy additions may be present to enhance the properties of the subsequently brazed joint.

The or each inorganic material may be any suitable material to form a flux during brazing. In one preferred embodiment, a potassium aluminium fluoride flux is provided as the inorganic material, or two or more inorganic materials are provided which, during brazing, form a potassium aluminium fluoride flux. In another preferred embodiment, a potassium-fluoro-aluminate material is provided as the inorganic material or two or more inorganic materials are provided which, during brazing, form a potassium-fluoro-aluminate flux. The or each inorganic material or the material resulting from the or each inorganic material during brazing may suitably be non-metallic, may be ionic and may be a salt, such as a potassium-fluoro-aluminate salt.

Surprisingly, when heating in air by itself it was seen that the salt reacted with oxygen to form oxides. This was seen as a mass gain in the Differential Scanning Calorimetry (DSC) analysis of pure salt samples, see FIG. 8. Since, in the case of the spray formed composite, the salt is fully enclosed in an aluminium matrix from the moment of deposition until remelting during the brazing operation, the salt is protected from oxidation and hydration. In a powder mixture prior to compaction and densification, the open porosity is substantial and the oxygen in the atmosphere has access to the interior of the body. This oxidation of the salt is detrimental for the subsequent flux activity. The salt in the spray formed composite material is protected from the adverse effect of air exposure upon heating and also has substantially no internal oxide to contend with. The flux action is thus maintained until such time that the salt melts, is released from inside the composite, breaks up the oxide and spreads over the surface.

The composite material may have an inorganic material content of 0.2 to 10 wt %. The composite material preferably has an inorganic material content of at least 0.9 wt %, more preferably at least 1.2 wt %. The composite material preferably has an inorganic material content of no more than 5 wt %, more preferably no more than 4 wt %. In a particularly preferred embodiment, the composite material has an inorganic material content of about 2 to 3 wt %. If there is not enough salt in the composite material, then the quality of the joint is affected, or indeed no joint will be formed. If there is too much inorganic material in the composite material then it is no longer sufficiently ductile to accept subsequent mechanical work, which is important in most contexts.

The spray formed composite material will be characterised by non-macro-segregated, rapidly solidified phases of silicon and aluminium, in which the primary Si phase may exhibit an average size less than 1 micron and a maximum size of less than 5 microns with the less rapidly solidified inorganic salt phase being distributed over a very wide size range, much greater than that of the injected inorganic material or inorganic materials with a typical sizes in the range 5-15 microns, such composite may include extremely fine salt particles less than 1 micron in size and a microsegrated phase with particles up to 200 microns in size corresponding to the last parts of the composite to solidify. The images in FIGS. 3, 4, 5, 6, 7, 9, and 10 depict some aspects of the microstructure of embodiments of the material according to the present invention. Early indications are that the embodiments show a bi-modal log normal distribution.

The Si particle sizes in spray formed composite materials are much smaller than those made using casting, including direct chill casting or rheocasting processes, see FIGS. 9 and 10. A small Si particle size is beneficial in providing rapid melting of the braze cladding material and efficient flow of the melt to prospective joint sites. The small Si particles can be achieved without addition of modifying substances, e.g. Sr. Small Si particles in the material, which may be less than 10 microns in diameter, preferably less than 5 microns more preferably less than 3 microns are also beneficial in very thin products with little cladding; small Si particles assist in making a continuous melt pool on the surface of e.g. condenser fin stock to provide more efficient joint formation. Also, the smaller Si particle size of the spray formed composite should be beneficial for the high temperature strength of clad rolled products (increases strength) which in turn should provide less overflow on the sides of, for example, rolling ingots, thus improving material yield and cladding thickness homogeneity.

The injected inorganic material or inorganic materials dehydrate during the injection, flight and deposition stages. Furthermore, contrary to expectation, the inorganic material contained within the spray formed composite is significantly crystallographically different to that of the inorganic material prior to injection or such material after dehydration, as shown in FIGS. 12 and 13. Our investigations have shown that the phase composition of the salt in the composite differs markedly from that of the injected raw material, and can in parts appear as an amorphous phase due to its melting and subsequent rapid solidification. This obviously would not be expected from the prior known method of simple mixing and compaction of flux and aluminium-silicon powder (because the flux does not melt) or indeed from rheocasting of melted metal containing flux and aluminium-silicon alloy (because the flux will solidify slowly). Early indications are that the melting point of the transformed salt in the composite is lower than that of the injected salt. Experiments carried out on the salt in the composite using DSC indicate an onset of melting at around 550° C., sometimes followed by a second onset of melting at 563° C., see FIG. 2. This is in clear contrast with the melting of the injected salt only, which displays a single melting endotherm. It is also in clear contrast to the same aluminium-silicon alloy without any salt, where only the normal and expected eutectic endotherm at 577° C. was seen.

This transformed inorganic salt results in improved fluxing activity during brazing operations.

The inter-particle spacing between adjacent salt crystals in the piece is preferably less than 10 microns or more preferably less than 5 microns.

The overall oxygen content of the piece as a whole is preferably no more than 1000 ppm by weight. Preferably further the oxygen content of the piece is no more than 500 ppm, more preferably no more than 300 ppm and it may even be less than 250 ppm.

According to another aspect of the invention there is provided a component comprising at least one piece according to the first aspect of the invention attached to a metal article such as a billet, ingot or slab.

The or each piece may be metallurgically bonded on to the metal article, for example by means of mechanical working such as hot or cold rolling. In one embodiment, two pieces according to the first aspect of the invention are attached to the metal article on opposite sides thereof. This may be further worked, for example by rolling to a sheet. The component may be of any suitable shape and for any suitable use, but in a preferred embodiment the component after working is a component to be connected by brazing in a heat exchanger, such as an automotive radiator, condenser, evaporator, oil cooler, charge air cooler or fuel cooler, or a stationary heat exchanger. Indeed, the component may be plate, fin or tube to be brazed in place in a heat exchanger, such as an automotive radiator. In addition the brazing sheet can be used for the manufacture of any brazed part including but not limited to electronic, mechanical and engineering parts.

According to a further aspect of the invention there is provided a method of making a piece according to the first aspect of the invention or a component according to the second aspect of the invention, the method comprising the steps of atomising a stream of molten metal or metal alloy material into a spray of droplets, introducing the or each inorganic material into the stream or spray, and consolidating the materials by spray forming to form a composite piece in which inorganic material is distributed in a metal or metal alloy matrix.

According to another aspect of the invention there is provided a method of making a self fluxing brazing piece, the method comprising the steps of atomising a stream of molten metal or metal alloy material into a spray of droplets, introducing into the stream or spray at least one inorganic material, the inorganic material or inorganic materials being arranged to form a flux during brazing, and consolidating the materials by spray forming to form a composite piece in which the inorganic material is distributed in a metal or metal alloy matrix.

The technique of spray forming results in very little oxidation of the materials particularly of aluminium alloys due to the extreme rapidity of the spray forming operation in which inert gas atomised droplets are formed and reconsolidated within milli-seconds, in an inert atmosphere, normally nitrogen. This also means that the inorganic material or materials, which form a flux during brazing, have only a small inherent oxide content to contend with, which does not interfere with the ability of the flux to be effective in the area where it is required, namely on the surfaces to be brazed. Furthermore, as the flux is contained within the composite it will not be oxidised itself during the heating stage prior to melting and brazing. Consequently, only a minimal amount of salt is required which combined with the low oxide content of the matrix alloy renders the material relatively ductile readily permitting hot or cold working. Consequently, quite surprisingly, in one rapid and integrated operation a composite material can be formed with minimal oxygen pick up, with a rapidly solidified matrix, containing fine silicon precipitates and a fine grained aluminium phase, such aluminium phase entrapping inorganic particles so that no macrosegregation of the solidifying salt can form during final solidification such composite exhibiting a high density with no interconnected porosity such that no oxide is picked up during further processing, with excellent workability and with excellent brazing properties such that during brazing substantially all the inorganic salt is available to promote the formation of a thermally induced metallic bond.

The oxygen content of the composite material is preferably no more than 500 ppm greater than the combined oxygen content of the molten alloy and the flux from which such composite was made. Preferably further the oxygen content of the composite is no more than 250 ppm, more preferably it may even be less than 100 ppm than the component parts from which it was made.

The inorganic material may be atomised. The inorganic material may be atomised into droplets of a smaller size than the droplets of metal or metal alloy material, which may have a mean diameter in the range of 50 to 150 microns. Alternatively, the inorganic material may be introduced as solid particles. The solid particles of inorganic material may be of a mean diameter of 10 microns or less.

The introduced material is inorganic, has a lower melting point and may be insoluble and immiscible with the metal or metal alloy material in the molten form, is wetting to the metal or metal alloy material and also has the capability to form a flux by dissolving oxides. Despite such inorganic particles being insoluble and immiscible in the metal or metal alloy, the rapid solidification of the sprayed metal or metal alloy entraps the inorganic particles so that no macrosegregation of the solidifying inorganic material can occur during final solidification. The inorganic material may be caused to at least partially melt when introduced or when in flight but will be substantially fully molten immediately after deposition where the deposit will be at about the solidus temperature of the metal alloy and therefore above the melting point of the salt. Where a continuous solid piece is to be formed, the prior art has mainly relied upon the spraying of molten metal or metal alloy material, possibly with non-molten ceramic particles, which have a high melting point and remain solid throughout. The inventors have surprisingly found that a billet can be built up forming a non macro-segregated composite structure by spray forming of a molten metal or metal alloy material with one or more inorganic, flux forming materials which have a lower melting point than the metal or metal alloy material and at least partially melt when introduced or when being sprayed. The inorganic material may be at least partially molten and is preferably substantially fully molten when spray deposited on to a collector surface with the metal or metal alloy material. This makes the formation of a composite piece with the inorganic material non macro-segregated in a metal or metal alloy matrix still more surprising due to its insolubility and immiscibility. Heat extraction from the metal or metal alloy droplets is controlled during spraying so as to trap the inorganic salt and therefore to prevent separation on a macro-scale. Interestingly the size and distribution of the flux particles in the metal or metal alloy matrix bear no relationship to the size of injected inorganic salt. For example, the mean size of the injected salt is typically 10 microns and may be in the range 5 to 15 microns. The intimate mixing of metal droplets and salt during flight and deposition together with the impact and rapid deposition of salt and droplets onto the deposition surface results in the salt melting and solidifying in a wide size distribution with extremely fine particles of flux less than 1 micron being formed in the alloy matrix together with coarser particles up to 200 microns in size being formed from a limited coalescence of salt in the last areas of the composite to solidify (see FIG. 3) Following mechanical working the salt phase is progressively broken down into fine particulate typically less than 5 microns in size.

The inter-particle spacing between adjacent salt crystals in the piece is preferably less than the diameter of the aluminium-silicon droplets from which the spray formed composite piece was formed. The maximum inter-particle spacing between adjacent salt crystals in the piece is preferably in any case less than 10 microns or more preferably less than 5 microns.

The composite piece formed by the method of the invention may be used by itself as a separate item. Alternatively, the composite material may be attached to a metal article such as an ingot, billet or slab. The composite material may be attached to one side of the metal article, or alternatively two pieces of composite material may be attached to the metal article on opposite sides thereof. The composite material may be attached on to the metal article by any suitable technique and may be attached for example by hot or cold roll bonding. Alternatively, the composite material may be attached to the metal article during the consolidation of the materials by spray forming, in that the materials may be spray formed on to a metal article to bond thereto. Further specific variants are that the composite material may be spray formed directly onto a metal article in the form of a cylindrical or tubular billet or a metal strip.

Once the composite material has been attached to the metal article the component thus created may be subjected to mechanical work, for example by forging and/or rolling and/or extrusion.

According to another aspect of the invention there is provided a method of making the brazed joint, the method comprising placing a brazing piece according to the first aspect of the invention or placing the composite material part of a component according to the second aspect of the invention in direct contact with another metal or metal alloy piece and heating the joint in the absence of added flux.

According to a further aspect of the invention there is provided a method of making a brazed joint, the method comprising carrying out the method according to the third or fourth aspect of the invention, placing the composite material in direct contact with a metal or metal alloy piece, and heating the joint in the absence of added flux.

In either of the two preceding aspects of the invention, the heating of the joint may take place in an inert or reducing atmosphere, or in a moderate vacuum.

According to another aspect of the invention there is provided a spray formed or a spray formed and mechanically worked self-fluxing brazing piece comprising a composite material comprising a rapidly solidified aluminium-silicon alloy characterised by primary silicon precipitates of average size less than 10 microns distributed uniformly in an aluminium matrix, the aluminium matrix being inter-dispersed with at least one inorganic salt material of a lower melting point than the aluminium silicon alloy and insoluble and immiscible in the aluminium silicon alloy, the inorganic material or inorganic materials melting during brazing to promote the formation of a thermally induced metallic bond.

According to a further aspect of the invention there is provided a self-fluxing brazing piece comprising a spray formed composite material comprising a rapidly solidified aluminium-silicon alloy characterised by primary silicon precipitates of average size less than 10 microns distributed uniformly in an aluminium matrix, the aluminium matrix being inter-dispersed with at least one inorganic salt material of a lower melting point than the aluminium silicon alloy and insoluble and immiscible in the aluminium silicon alloy, the inorganic material or inorganic materials melting during brazing to promote the formation of a thermally induced metallic bond, the inorganic salt material or materials being present in the piece in the form of solidified crystals exhibiting a bimodal distribution of fine crystals less than 10 microns in size and coarser crystals 5 to 200 microns in size, the said coarser crystals being micro-segregated to the last regions of the composite to solidify.

According to another aspect of the invention there is provided a method of making a self fluxing brazing piece, the method comprising the steps of atomising a stream of molten aluminium silicon alloy material into a spray of droplets, introducing into the stream or spray at least one inorganic material, the inorganic material or inorganic materials being arranged to form a flux during brazing, and consolidating the materials by spray forming to form a composite piece characterised by primary silicon precipitates of average size less than 10 microns distributed uniformly in an aluminium matrix, the aluminium matrix being inter-dispersed with at least one inorganic salt material of a lower melting point and insoluble and immiscible in the aluminium silicon alloy, such salt material or materials being in the form of solidified crystals exhibiting a bimodal distribution of fine crystals less than 10 microns in size and coarser crystals 5-200 microns in size, the coarser crystals being micro-segregated to the last regions of the piece to solidify such that the inter-particle spacing between any of the salt crystals is markedly less than the diameter of the aluminium-silicon droplets from which such spray formed composite was formed and in case less than 20 microns, such composite being characterised by an oxygen content no greater than 100 ppm more than the combined oxygen content of the molten aluminium-silicon alloy and inorganic salt from which the composite was originally formed such that substantially all of the inorganic salt is available to form a flux during brazing to promote the formation of a thermally induced metallic bond.

Embodiments of the invention will now be described by way of example and with reference to the accompanying drawings, in which:

FIG. 1 shows a sequence of manufacturing stages;

FIG. 2 shows three DSC traces: FIGS. 2a and 2b are the spray formed material of samples 3 and 4 respectively from Table 1. FIG. 2c is a normal AA4045 aluminium-silicon alloy;

Figure 12:
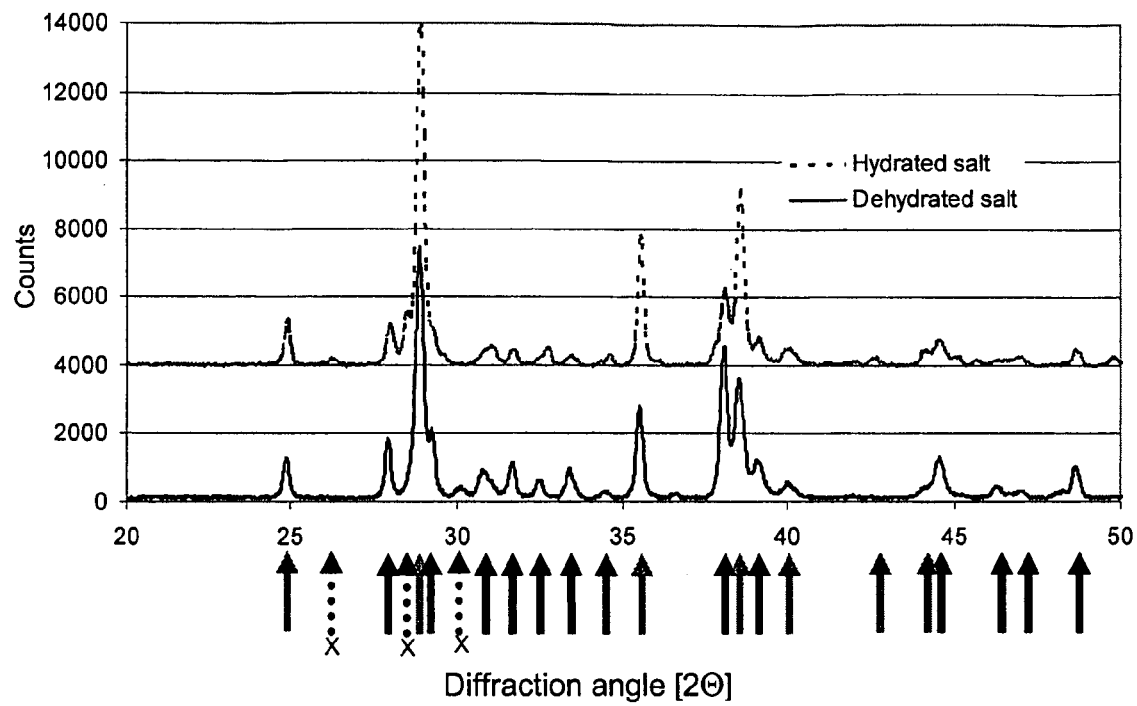
Figure 12:
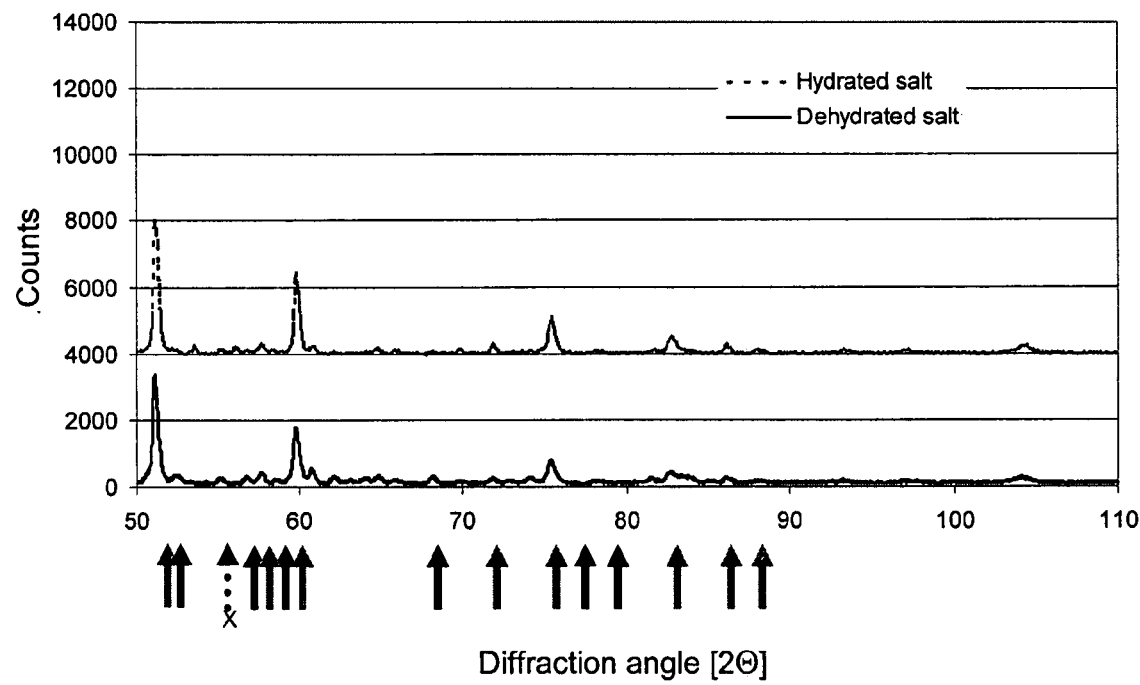
Figure 13:
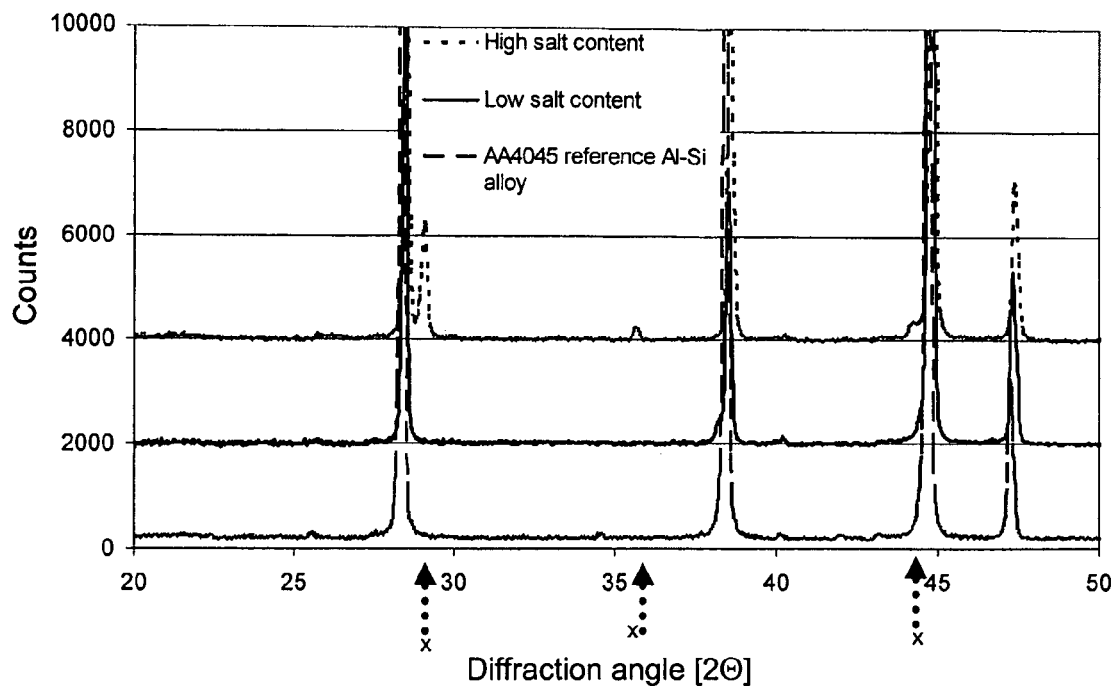
Figure 13:
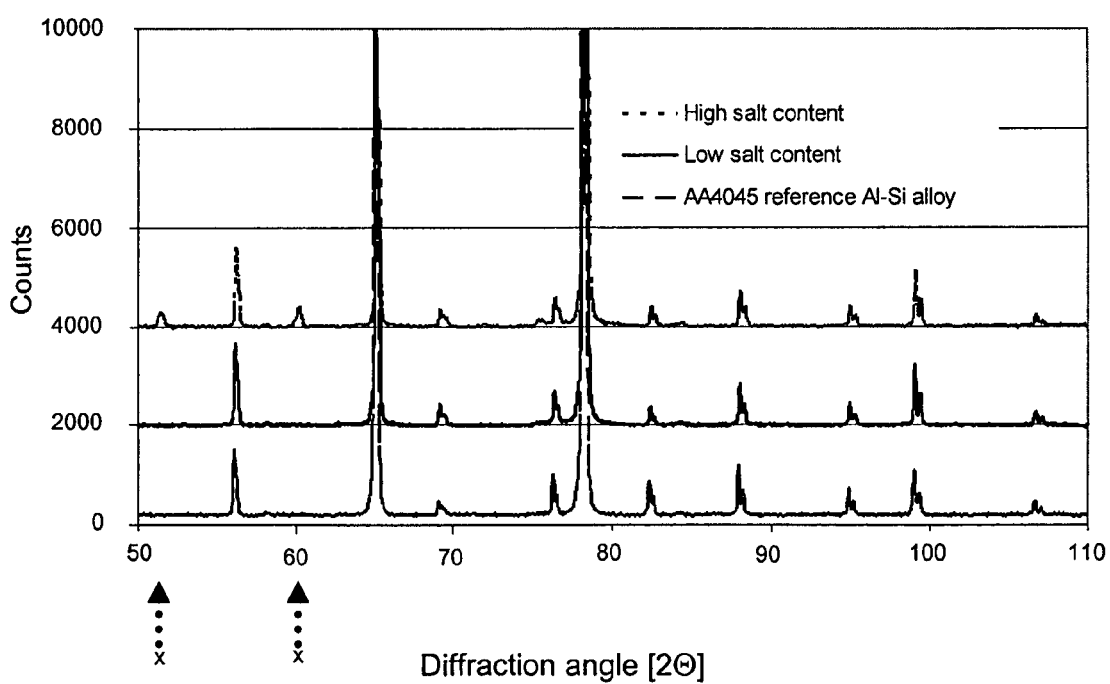

FIG. 12 is the XRD spectra of a hydrated and dehydrated salt, the dehydrated salt was used in the materials according to the present invention; and, FIG. 13 is the XRD spectra of two samples according to embodiments of the present invention and a normal AA4045 reference aluminium silicon alloy. The high salt content material corresponds to sample 12 in Table 2 and the low salt content material corresponds to sample 7 in Table 2.

Figure 1:
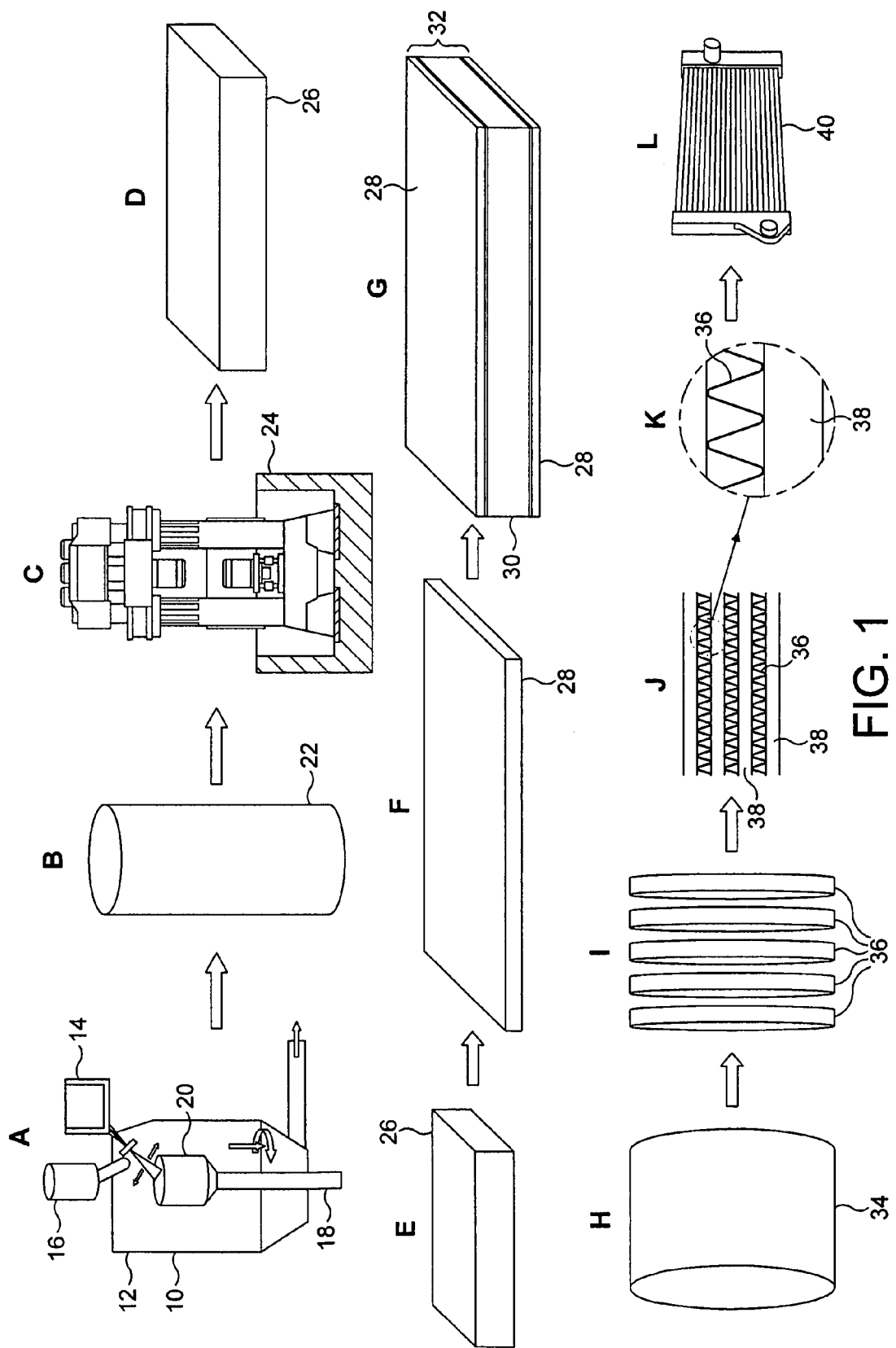

In the first operation shown in FIG. 1, spray forming apparatus 10 is used as shown at A. The apparatus 10 consists of a sealable spray chamber 12 with a tundish 14 and a hopper 16 mounted at the top of the chamber 12. A vertical column 18 extends from the floor of the spray chamber 12 and mounts a collector plate 20 at its upper surface. The column 18 is rotatable about its vertical axis and is also movable axially to control the height of the collector plate 20.

In use, the tundish 14 is filled with molten metal or metal alloy which is kept above its liquidus temperature in the tundish 14. The hopper 16 is filled with particles of an inorganic salt or a mixture of inorganic salts to form a flux during brazing. The tundish 14 issues a stream of molten metal or metal alloy into the spray chamber 12 which is converted into a spray of atomised droplets by atomising gas jets (not shown); the spray chamber first having been purged with inert gas, so that pick up of oxygen is minimised. The particles in the hopper 16 are injected into the spray chamber so as to merge with the atomised metal or metal alloy so that the combined spray impacts and collects upon the collector plate 20. In this way a billet 22 is formed as shown at B in FIG. 1 which may be for example 500 mm in diameter and 2 m in length. Sandvik Osprey's patent application WO92/15721 describes in more detail how billets can be spray formed and the disclosure thereof is incorporated herein by reference.

A forging machine 24 is shown at C in FIG. 1. The spray deposited material is forged to form a slab 26, as shown at D and E in FIG. 1, which may be 130 mm in thickness.

The slab 26 is rolled to form a sheet or liner 28 as shown at F in FIG. 1.

A relatively thick aluminium slab 30 may be clad on its two opposite major surfaces with two of the relatively slim liners 28 as shown at G in FIG. 1. This laminated component 32 is then hot and cold rolled and coiled into a coil 34 as shown at H in FIG. 1.

The coil H is then slit to form finstock components 36 as shown at I in FIG. 1.

Each finstock component 36 is then corrugated and assembled in layers with heat exchanger tubes 38, as shown at J and in detail at K in FIG. 1, and is brazed in a nitrogen atmosphere before being assembled with other parts to form the completed heat exchanger 40, as shown at L in FIG. 1, which may be used, for example, as an automotive radiator.

EXAMPLE 1

In one specific example, the tundish 14 contained molten aluminium 10 wt % silicon alloy. In the hopper 16 the solid particles were potassium-fluoro-aluminate particles of mean diameter 10 microns. The parameters for the spray forming were as follows:

| Metal Flow Rate | 6.94 kg per minute |
| Metal temperature | 700° C. |

-continued

| Particle flow rate | 0.71 kg per minute |
| Particle temperature | 20° C. |
| Atomising gas | Nitrogen |
| Temperature of nitrogen gas | room temperature |
| Gas flow rate | 9.71 m$^3$ per minute |
| Distance to collector plate 20 | 890 mm |

This results in metal alloy particles with an average particle diameter of 50 microns. The collector plate 20 on the column 18 is rotated to ensure even deposition and retracted downwards to maintain the optimum stand off distance for travel of the material to the collector plate 20.

The potassium-fluoro-aluminate particles melt at a temperature of about 560° C., which is less than the solidus of the aluminium silicon alloy of about 577° C. The inorganic salt material is heated by the atomising gas and by contact with the metal alloy droplets so that the particles of inorganic salt are caused to at least partially melt before impact on the collector plate. Potassium-fluoro-aluminate is insoluble in aluminium alloy and so remains separate in the spray forming process.

By controlling the parameters described above, heat extraction can be controlled. A composite piece can be made which has the inorganic salt material trapped in the metal matrix such that the maximum distance between the flux particles is no greater than the average particle size of deposited droplets but typically much less than this and in fact typically less than 10 microns. Despite the inorganic salt material being immiscible in the metal alloy, the constant arrival of new droplets and the temperature control of solidification means that the inorganic salt material is not able to separate out on a macro-scale with the result that the inorganic salt material is trapped in the solidifying deposit, forming the required distribution through the resulting composite billet.

It is to be noted that, as the inorganic flux material used is immiscible in the aluminium alloy then, if the conditions are not correctly maintained, for example if the deposition conditions are too hot as a result of insufficient heat being extracted by the atomising gas the inorganic salt material can macro-segregate resulting in a product which will be more difficult to form a coherent billet and to mechanically work and will produce less satisfactory and uniform brazing results. It is also possible to extract excessive heat from the alloy droplets during flight which can result in a particulate microstructure with lines of flux delineating the deposited droplet boundaries. Such a structure can also be difficult to mechanically work and can contain interconnected porosity leading to undesirable internal oxidation during processing.

The conditions outlined above result in the composite piece which has 1.2 wt % of Potassium in the aluminium silicon alloy which is equivalent to approximately 4 wt % of the inorganic salt.

The overall oxygen content of the piece is 232 ppm by weight. As the inorganic salt is likely to have an inherent oxygen content above this level the oxygen content of the alloy matrix is likely to be less than 232 ppm by weight.

This material forms a good braze joint, has good ductility and can be worked to form a sheet from which components can be formed.

EXAMPLE 2

A composite piece was made in a similar way as in Example 1 except that the particle flow rate was controlled so that the billet thus formed had a variable salt content along its length from 0.1 to over 6 wt %. The gas flow rate was also controlled to maintain constant deposition conditions during the introduction of variable amounts of flux particles.

Five slices were taken from the billet. The slices contained approximately 0.1, 0.9, 2, 4.3 and 6 wt % inorganic salt respectively The slices were rolled from 10 mm to a thickness of approximately 0.4 mm. The results are shown in Table 1 below. From the results it is seen that the rolling operation was successful with the exception of the sample containing 6% inorganic salt, which started to crack along the edges after excessive work.

A small disc, 5 mm in diameter, was punched from each rolled slice (0.4 mm) and placed on a token measuring 17×28 mm of AA3003 aluminium alloy representing a core layer. Samples were subjected to a standard brazing cycle under nitrogen in a furnace. Sample 1 (0.1% salt) failed to react, took time to melt with some oxide skin evident and no visible flux action. Sample 2 (0.9% salt) formed a ball at brazing temperature with some surface flux activity on the filler metal, but no visible flux action on the AA3003 token. After a short period, the ball collapsed to wet the surface. Samples 3, 4 and 5 (2, 4.3 and 6% respectively) melted quickly with good flux action and good filler metal wetting of the token. The melt activity ratio is derived from the relative spreading areas of the flux with respect to the filler metal spread.

TABLE 1

Summary of rolling and brazing properties of variable inorganic salt containing material

| Sample # | K wt % | Approximate inorganic salt wt % | Rolling Properties | Machining Properties | Brazing disc | Melt Activity Ratio |
|---|---|---|---|---|---|---|
| 1 | 0.031 | 0.1 | Good | Ductile | No flux activity | 0 |
| 2 | 0.3 | 0.9 | Good | Ductile | Marginal | 1 |
| 3 | 0.57 | 2 | Good | Ductile | Active | 1.3 |
| 4 | 1.21 | 4.3 | Good | Ductile | Active | 1.5 |
| 5 | 1.7 | 6 | Poor | Brittle | Very active | 2.2 |

To assess the brazing properties as a function of relative inorganic salt content, samples were drilled at 20 mm intervals along the length of the variable billet and approximately 0.12 g of the material placed on an AA3003 token for brazeability testing. Samples containing 0.06 to 0.14% salt had no apparent brazing activity. Brazing activity increased with salt content with a transition in brazeability observed between 0.14 and 1.2% inorganic salt. Good brazing properties were exhibited by material containing 1.2% inorganic salt and higher with good flux activity with an active melt that wet and spread over the surface of the AA3003 token. Material containing the highest level of salt (5.73%) showed greatest flux activity, more than is required in practice to allow for good filler metal flow.

TABLE 2

Braze activity as a function of inorganic salt content

| Sample | K wt % | Approximate inorganic salt wt % | Melt Activity Ratio |
|---|---|---|---|
| 6 | 0.019 | 0.06 | No activity |
| 7 | 0.022 | 0.08 | No activity |
| 8 | 0.048 | 0.14 | No activity |
| 9 | 0.345 | 1.22 | 1.1 |
| 10 | 0.686 | 2.47 | 1.3 |
| 11 | 0.710 | 2.54 | 1.4 |
| 12 | 1.212 | 4.34 | 1.5 |
| 13 | 1.750 | 5.73 | 1.9 |

Brazed joint formation between samples of material roll bonded to AA3003 and rolled to a final gauge of 0.4 mm and brazed to unclad AA3003 tokens was assessed. The samples were from the variable flux content billet described above. Samples containing 2.5 and 5.7 wt % inorganic salt produced excellent T-brazed joints with unclad material. Good fluxing activity was observed with rapid capillary flow of filler metal into the joint. The brazed joints were well defined with a smooth meniscus between faying surfaces. Similarly good brazed joints were formed between unclad fin material and the clad sample material containing 2.5% inorganic salt. Brazed joints were similar to those produced between a reference sample of clad material and fin that had been fluxed in a conventional manner. In the absence of flux application the reference sample did not braze.

In closed cup brazing experiments good internal brazed joints were produced between the clad surfaces of formed sample material containing 2.5 wt % inorganic salt. Samples that had exhibited marginal brazing activity on a AA3003 token formed acceptable internal brazed joints when clad surfaces were brazed to themselves, but poor external brazed joints.

Figure 2:
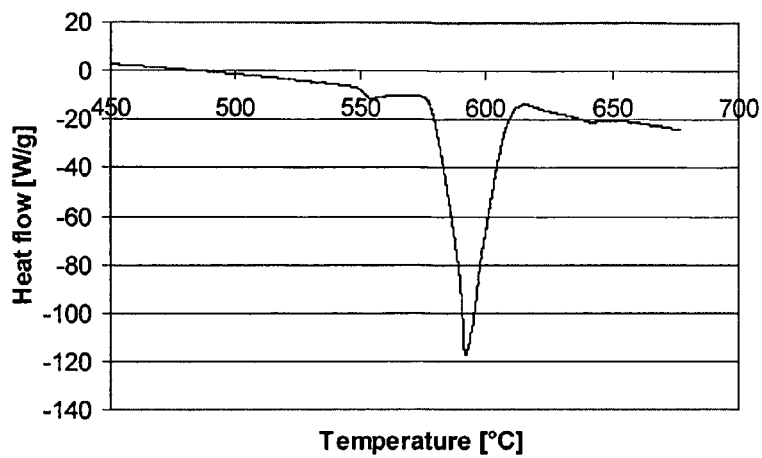
Figure 2:
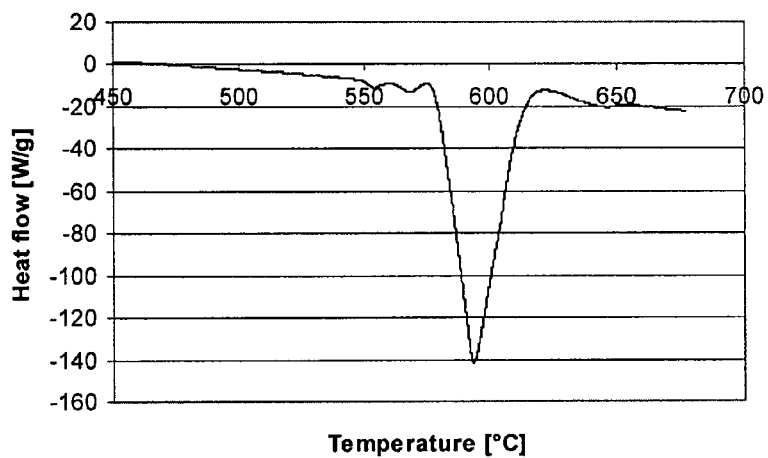
Figure 2:
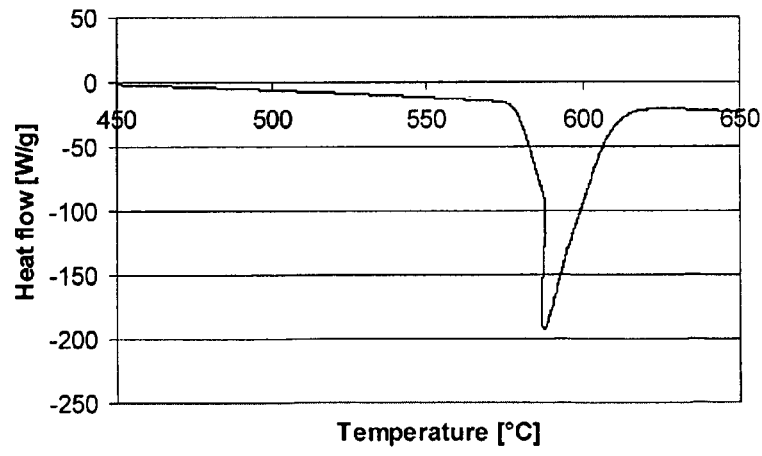

FIG. 2 shows three DSC traces. FIGS. 2a and 2b are the spray formed material of samples 3 and 4 respectively from Table 1. FIG. 2c is a normal AA4045 aluminium-silicon alloy. The spray formed composite samples show one (a) and two (b) endothermic melting peaks at temperatures lower than the onset of melting of the aluminium-silicon alloy matrix. The additional melting peaks correspond to melting of the inorganic salt.

Figure 3:
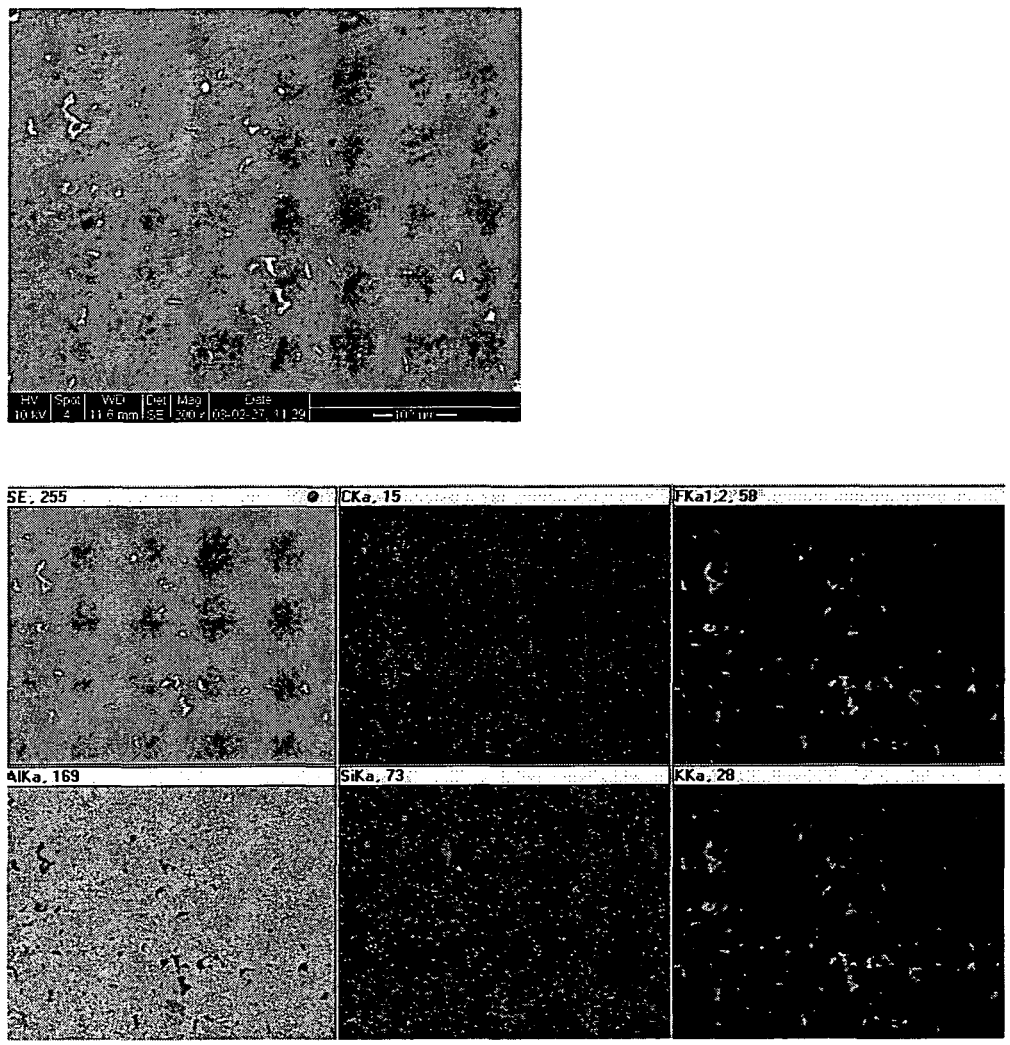
FIG. 3 shows a Scanning Electron Micrograph as the largest image and six smaller images which are EDS maps. The material is sample 4 of Table 1.

FIG. 3 shows a Scanning Electron Micrograph as the largest image and six smaller images which are EDS maps. The material is sample 4 of Table 1. In the EDS maps, the brightness of the contrast in the map is indicative of the concentration. The scale is given at the foot of the main micrograph.

Figure 4:
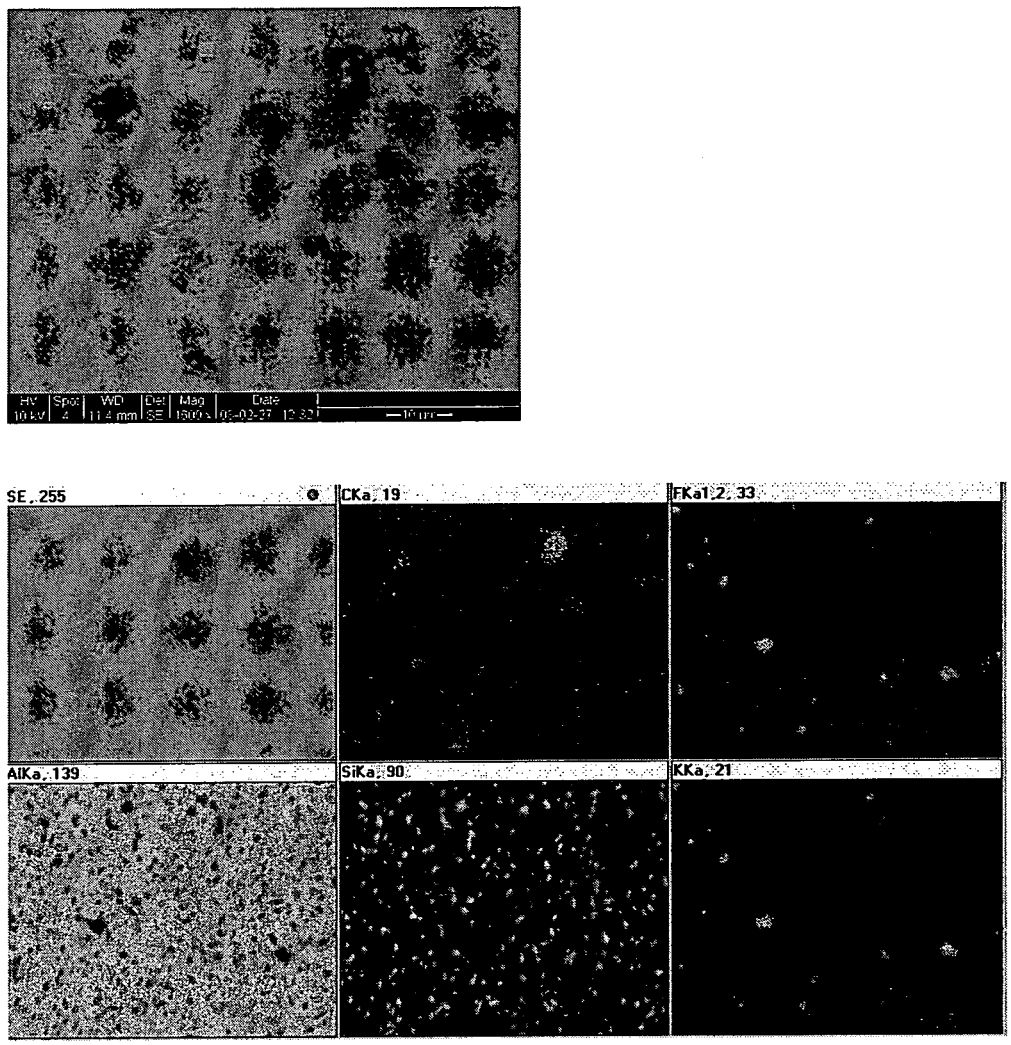
FIGS. 4 and 5 are equivalent views at respectively greater magnification.
Figure 5:
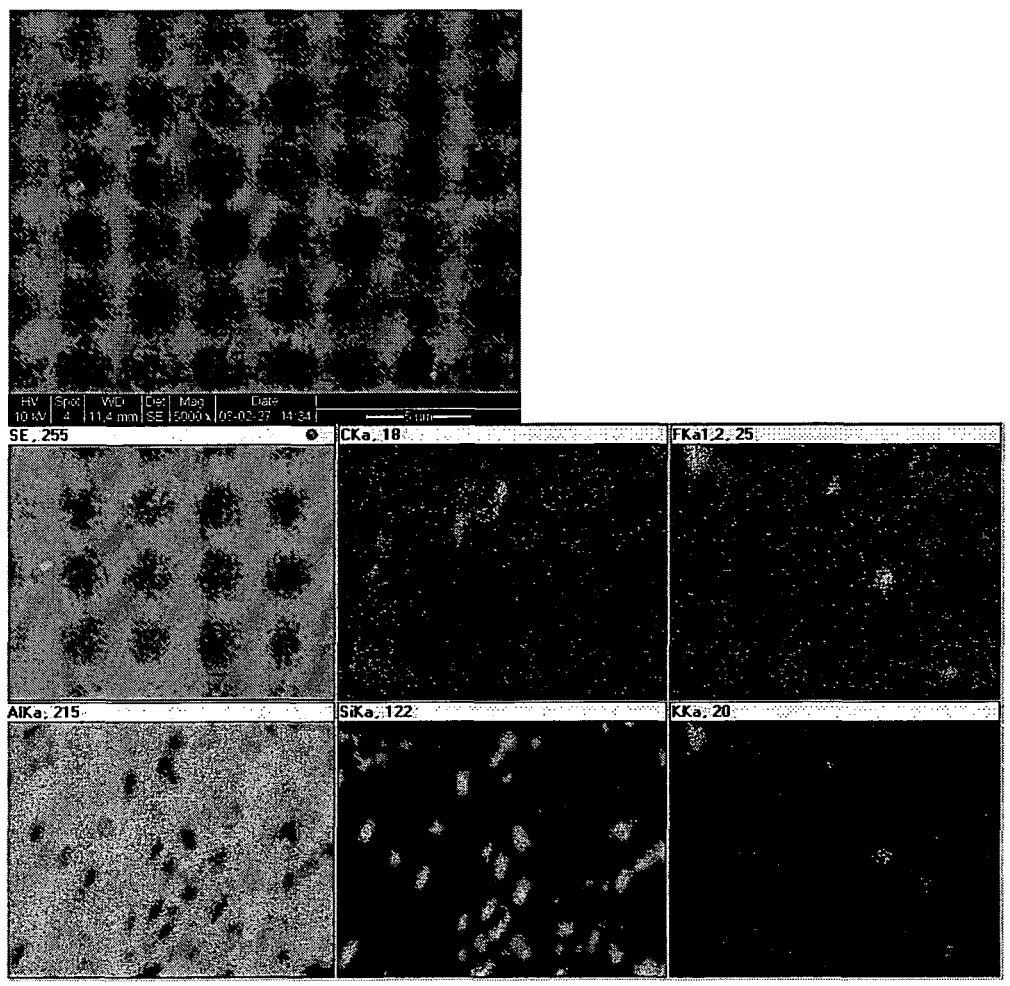

FIGS. 4 and 5 are equivalent views at respectively greater magnification.

FIGS. 3, 4 and 5 show the distribution and scale of the salt in the alloy matrix, and also show the presence and distribution of silicon particles.

Figure 6:
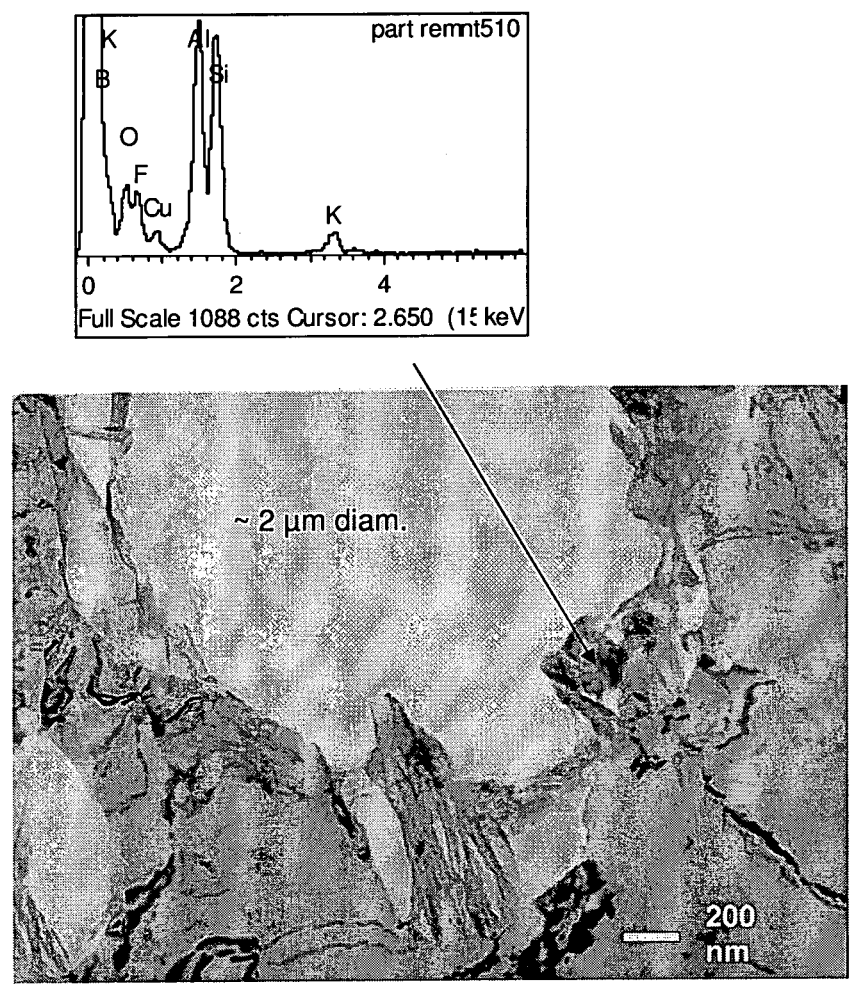
FIG. 6 shows a TEM caption from an ultramicrotomed spray formed composite material which is sample 11 in Table 2.

FIG. 6 shows a TEM caption from an ultramicrotomed spray formed composite material which is sample 11 in Table 2. Adjacent to the large pull-out from an Si particle, flux remnants can be seen, as indicated in the EDS spectrum above for the arrowed area. The Cu originates from the Cu grid used to mount the sample in the TEM.

Figure 7:
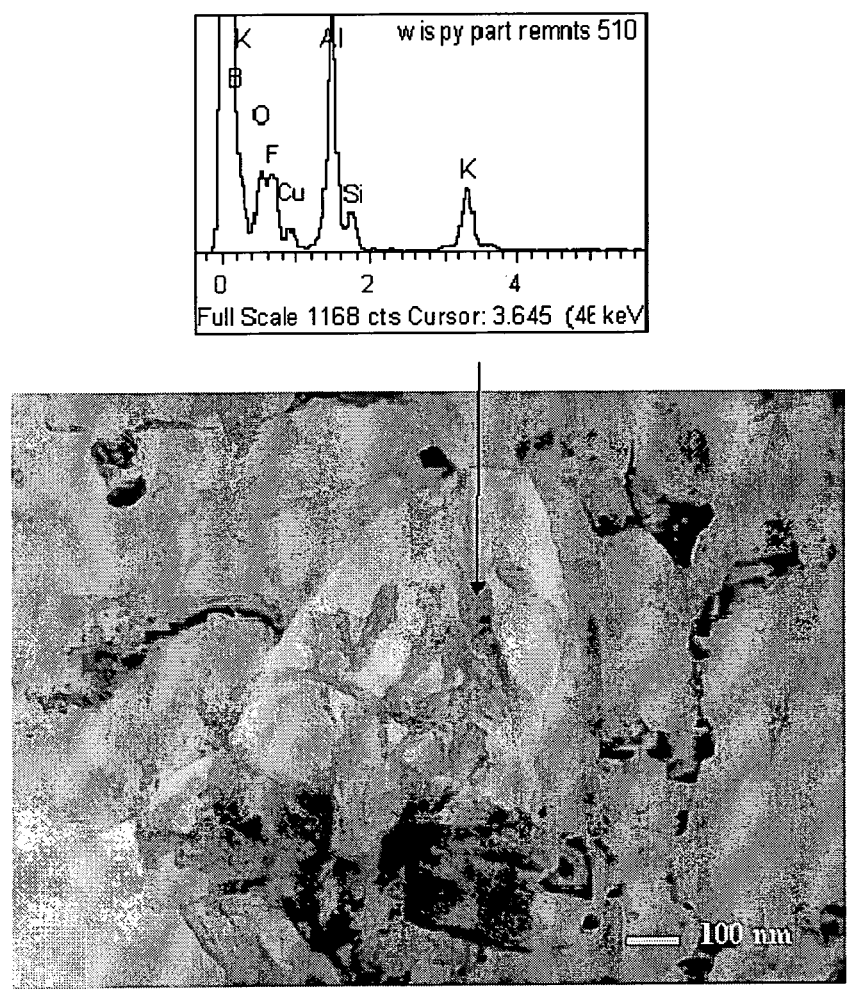
FIG. 7 shows another TEM caption from another part of an ultramicrotomed spray formed composite material sample which is sample 11 in Table 2, at increased magnification as can be seen by the scale on the micrograph.

FIG. 7 shows another TEM caption from another part of an ultramicrotomed spray formed composite material sample which is sample 11 in Table 2, at increased magnification as can be seen by the scale on the micrograph. Adjacent to the large pull-out from an Si particle flux remnants can be seen as indicated in the EDS spectrum. As before, the Cu originates from the Cu grid used to mount the sample in the TEM. The particle remnants or shards are the expected result of the break up of the shell of inorganic salt which forms on an atomised alloy droplet in spraying following contact between a hot alloy droplet and a solid particle of the inorganic material which is immiscible in the alloy.

Figure 8:
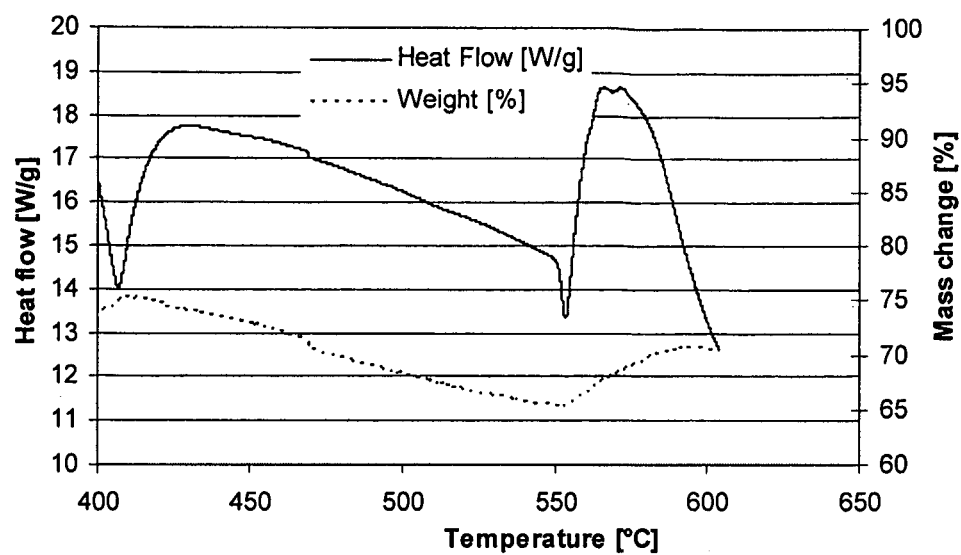
FIG. 8 is a DSC trace of the pure potassium-fluoro-aluminate salt used in the embodiments in dehydrated form.

FIG. 8 is a DSC trace of the pure potassium-fluoro-aluminate salt used in the embodiments in dehydrated form. It is seen that there is rapid mass gain upon melting which indicates oxidation of the flux. Since, in the case of the spray formed composite, the salt is fully enclosed in an aluminium matrix from the moment of deposition until remelting during the brazing operation, the salt is protected from oxidation and hydration. The flux action is thus maintained until such time that the salt melts, breaks up the oxide and spreads over the surface.

Figure 9:
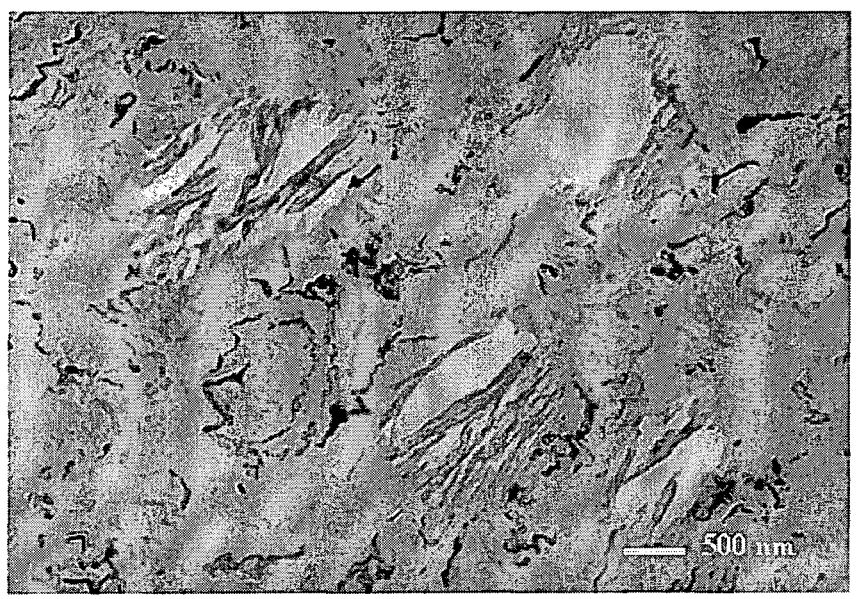
FIG. 9 is a TEM caption from an ultramicrotomed sample of a direct chill cast AA4045 aluminium-silicon reference alloy.

FIG. 9 is a TEM caption from an ultramicrotomed sample of a direct chilled AA4045 aluminium-silicon reference alloy. Note the large pull-outs from the pale Si particles. The silicon particles are greater than 500 nm in diameter.

Figure 10:
FIG. 10 is a TEM caption from an ultramicrotomed spray formed composite sample which is sample 11 in Table 2.

FIG. 10 is a TEM caption from an ultramicrotomed spray formed composite sample which is sample 11 in Table 2. Numerous but small pull-outs from Si particles are seen.

Figure 11:
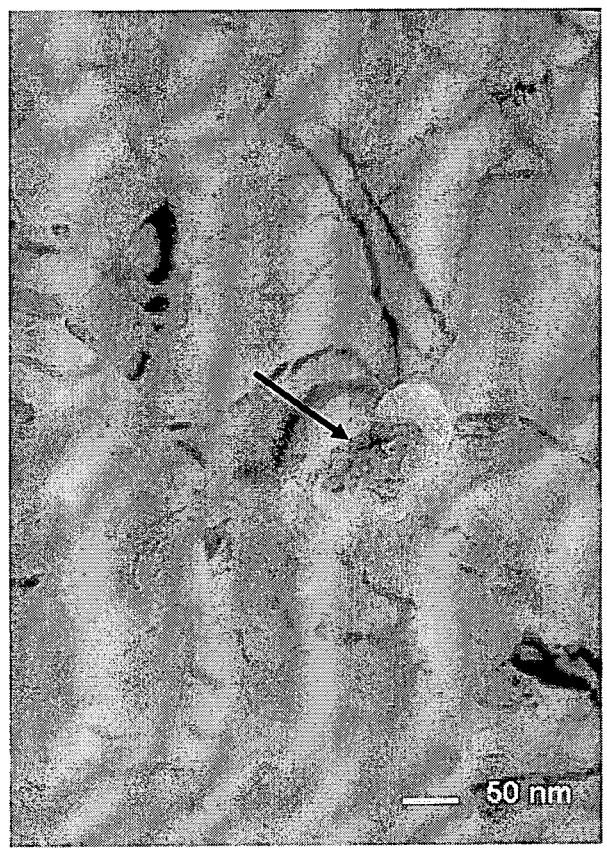
FIG. 11 is a TEM caption from an ultramicrotomed spray formed composite sample material which is sample 11 in Table 2.

FIG. 11 is a TEM caption from an ultramicrotomed spray formed composite sample material which is sample 11 in Table 2. The image depicts a K—Al—F-rich particle (arrowed) in a triple grain boundary. The particle is about 100 nm across and hence is very much smaller than the silicon particles seen in the reference brazing alloy of FIG. 9.

FIG. 12 is the XRD spectra of a hydrated and dehydrated salt, the dehydrated salt was used in the materials according to the present invention. The grey arrows indicate the peak positions of $KAlF_4$, the black arrows indicate the peak positions of $K_2AlF_5(H_2O)$ while the peak positions marked X could not be identified.

FIG. 13 is the XRD spectra of two samples according to embodiments of the present invention and a normal AA4045 reference aluminium silicon alloy. The high salt content material corresponds to sample 12 in Table 2 and the low salt content material corresponds to sample 7 in Table 2. The arrows marked X indicate the peak positions of peaks that could not be identified, the remaining peaks originated from metallic aluminium, and from silicon.

The injected potassium-fluoro-aluminate material dehydrates during the injection, flight and deposition stages. Furthermore, contrary to expectation, the potassium-fluoro-aluminate material contained within the spray formed composite is significantly crystallographically different from that of the potassium-fluoro-aluminate material prior to injection or such material after dehydration, as shown in FIGS. 12 and 13. Our investigations have shown that the phase composition of the salt in the composite differs markedly from that of the injected raw material, and can in parts appear as an amorphous phase due to its melting and subsequent rapid solidification. The figures indicate that the melting point of the transformed salt in the composite is lower than that of the injected salt. Experiments carried out on the salt in the composite using Differential Scanning Calorimetry indicate an onset of melting at around 550° C., sometimes followed by a second onset of melting at 563° C., see FIG. 2. This is in clear contrast with the melting of the injected salt only, which displays a single melting endotherm, see FIG. 8. It is also in clear contrast to the same aluminium-silicon alloy without any salt, where only the normal and expected eutectic endotherm at 577° C. was seen, see FIG. 2c. This transformed inorganic salt results in improved fluxing activity during brazing operations.

Alternative inorganic salts to form fluxes include potassium tetra-, penta-, and hexa-fluoroaluminates ($KAlF_4$, $K_2AlF_5.H_2O$, $K_3AlF_6$), and the aforementioned salts that may also contain hydroxyfluoro- and oxyfluoroaluminium species ($AlF_2OH.H_2O$, $Al_2F_4O$, $AlF(OH)_2$, $AlFO$); sodium fluoroaluminates ($Na_3AlF_6$), caesium aluminium fluorides ($CsAlF_4$, $Cs_2AlF_5$); potassium silicofluorides ($K_2SiF_6$, $K_3SiF_7$), alkali zinc fluorides ($KZnF_3$) and potassium tin fluoride salts ($KSnF_3$, $KSnF_5$, $K_2SnF_6$ and $K_3SnF_7$) and the hydrates of all the above mentioned halide salts.

Although the inorganic salt material has been described as being supplied as solid particles from a hopper 16, in an alternative embodiment, the inorganic salt material could be supplied in liquid form, like the metal alloy, and atomised in the same way.

A cylindrical billet 22 has been shown, but the spray forming process can be used to make billets in numerous shapes, such as a plate or tube or as clad products.

Where local heating can be applied an entire component may be made as a piece in accordance with the invention and attached in place by brazing.

Where a clad component is required, an ingot of the core material may be put on the collector surface 20 so that spray deposition as described can take place directly onto the ingot. The resulting component can be used directly or forged and/or rolled as described.

The spray formed material can be used as deposited, without further work, or can be worked as required. Although rolling and forging have been described, other forms of hot or cold mechanical work, such as extrusion, for example, may be carried out on pieces made in accordance with the invention, depending on requirements.

Although brazing in a nitrogen atmosphere has been described, brazing could take place under a reduced atmosphere or in a vacuum. In view of the low inherent oxygen in a piece made according to the invention, the vacuum need not be a high vacuum, a moderate vacuum would still give a good brazing result.

The invention claimed is:

1. A molten alloy, spray-formed, self-fluxing composite material, comprising:
   a continuous, non-particulate matrix of an aluminum alloy; and
   at least one inorganic salt distributed as particles in the matrix,
   wherein the composite contains less than 1000 ppm by weight oxygen and a microstructure of the matrix has no interconnected porosity pathways for oxidation of said at least one inorganic salt by air or oxygen ingress, and
   wherein said at least one inorganic salt forms a flux during brazing to promote the formation of a thermally induced metallic bond.

2. A self-fluxing spray-formed composite material as claimed in claim 1, wherein the oxygen content of the matrix is no more than 350 ppm by weight.

3. A self-fluxing spray-formed composite material as claimed in claim 1, wherein the matrix is a brazing alloy.

4. A self-fluxing spray-formed composite material as claimed in claim 3, wherein the brazing alloy has aluminium and silicon as the major constituents.

5. A self-fluxing spray-formed composite material as claimed in claim 4, wherein the brazing alloy has a silicon content of 5 to 15 wt %.

6. A self-fluxing spray-formed composite material as claimed in claim 4, wherein the brazing alloy has a silicon content of 9 to 13 wt %.

7. A self-fluxing spray-formed composite material as claimed in claim 4, which contains silicon particles having an average diameter of less than 10 microns.

8. A self-fluxing spray-formed composite material as claimed in claim 1, wherein a potassium-aluminium-fluoride flux is provided as the inorganic material or two or more inorganic materials are provided which during brazing form a potassium-aluminium-fluoride flux.

9. A self-fluxing spray-formed composite material as claimed in claim 1, wherein a potassium-fluoro-aluminate flux is provided as the inorganic material or two or more inorganic materials are provided which during brazing form a potassium-fluoro-aluminate flux.

10. A self-fluxing spray-formed composite material as claimed in claim 1, wherein the composite material has a content of the at least one inorganic material of 0.2-10 wt %.

11. A self-fluxing spray-formed composite material as claimed in claim 1, wherein the at least one inorganic material has a lower melting point than the aluminum alloy matrix.

12. A self-fluxing spray-formed composite material as claimed in claim 1, wherein the at least one inorganic material is immiscible when in its molten form with the aluminum alloy matrix.

13. A self-fluxing spray-formed composite material as claimed in claim 1, wherein the at least one inorganic material is insoluble when in its molten form with the aluminum alloy matrix.

14. A self-fluxing spray-formed composite material as claimed in claim 1, wherein the at least one inorganic material forms particles in the composite material less than 1 micron in size.

15. A self-fluxing spray-formed composite material as claimed in claim 1, wherein the at least one inorganic material forms particles in the composite material of between 5 and 200 microns in size.

16. A self-fluxing spray-formed composite material as claimed in claim 1, wherein the inorganic material form particles in the composite material and the inter-particle spacing between adjacent particles is less than 10 microns.

17. A component comprising a metal article and a self-fluxing spray-formed composite material as claimed in claim 1 attached to the metal article.

18. A component as claimed in claim 17, wherein the at least one piece is roll bonded on to the metal article.

19. A component as claimed in claim 17, further comprising a second self-fluxing spray-formed composite material, wherein the first and second self-fluxing spray-formed composite materials are attached to the metal article on opposite sides thereof.

20. A component as claimed in claim 17, wherein the component is a component to be connected by brazing in a heat exchanger.

21. A component as claimed in claim 20, wherein the component is one of an automotive radiator, condenser, evaporator, oil cooler, charge air cooler or fuel cooler, or a stationary heat exchanger.

22. A component as claimed in claim 17, wherein the component is one of a fin, plate or tube to be brazed in place in a heat exchanger.

23. A component as claimed in claim 17, wherein the component is worked.

24. A brazed joint between two pieces, the brazed joint having been formed by placing a self-fluxing spray-formed composite material according to claim 1 in direct contact with another metal or metal alloy piece and heating the joint in the absence of added flux.

25. A heat exchanger including a brazed joint according to claim 24.

26. A brazed joint between two parts, the brazed joint having been formed by placing the self-fluxing spray-formed composite material according to claim 1 in direct contact with another metal or metal alloy part and heating the joint in the absence of added flux.

27. A heat exchanger including a brazed joint according to claim 26.

28. A self-fluxing spray-formed composite material as claimed in claim 1, wherein the self-fluxing spray-formed composite material has been worked.

29. A method of making by spray forming a self fluxing brazing piece, the method comprising, in a non-oxidising inert atmosphere, the steps of:
    atomising a stream of molten aluminum alloy material into a spray of droplets using a non-oxidising inert gas,
    introducing into the stream or spray at least one inorganic material, the at least one inorganic material being arranged to form a flux during brazing, and
    consolidating the materials by spray forming to form a composite material in which the at least one inorganic material is distributed as particles in a continuous, non-particulate aluminum alloy matrix, the inorganic material being substantially fully molten after deposition, and then solidifying,
    wherein heat extraction from the droplets of the materials is controlled during spraying to prevent macrosegregation of the inorganic material from the aluminum alloy, and
    wherein the composite contains less than 1000 ppm by weight oxygen and a microstructure of the matrix has no interconnected porosity pathways for oxidation of said at least one inorganic salt by air or oxygen ingress.

30. A method as claimed in claim 29, wherein the at least one inorganic material is melted and atomised to be spray formed.

31. A method as claimed in claim 29, wherein the at least one inorganic material is introduced as solid particles.

32. A method as claimed in claim 31, wherein the solid particles of inorganic material are of a mean diameter of 10 microns or less.

33. A method as claimed in claim 29, wherein the metal or metal alloy material is atomised into droplets with a mean diameter in the range 50 to 150 microns.

34. A method as claimed in claim 29, wherein the inorganic material has a lower melting point than the metal or metal alloy material.

35. A method as claimed in claim 29, wherein the at least one inorganic material is insoluble in the metal or metal alloy material.

36. A method as claimed in claim 29, wherein the at least one inorganic material is caused to at least partially melt when introduced or when being sprayed.

37. A method as claimed in claim 29, wherein the at least one inorganic material is substantially fully molten when spray deposited onto a collector surface with the aluminum alloy material.

38. A method as claimed in claim 29, wherein the at least one inorganic material is immiscible with the aluminum alloy material.

39. A method as claimed in claim 29, wherein the at least one inorganic material or materials form particles in the composite material and the inter-particle spacing between adjacent particles is less than the diameter of the aluminium-silicon droplets from which the spray formed composite piece was formed.

40. A method as claimed in claim 29, wherein the at least one inorganic material or materials form particles in the composite material and the inter-particle spacing between adjacent particles is less than 10 microns.

41. A method as claimed in claim 29, wherein the oxygen content of the piece is no more than 500 ppm greater than the combined oxygen content of the molten aluminum alloy and the at least one inorganic material prior to atomisation and spraying.

42. A method as claimed claim 29, wherein the composite material piece is attached to a metal article such as an ingot, billet or slab.

43. A method as claimed in claim 42, wherein two pieces of composite material are attached to the metal article on opposite sides thereof.

44. A method as claimed in claim 42, wherein the composite material is attached by hot or cold roll bonding onto the metal article.

45. A method as claimed in claim 42, wherein the composite material is attached to the metal article during the consolidation of the materials by spray forming in that the materials are spray formed onto a metal article to bond thereto.

46. A method as claimed in claim 42, wherein the composite material and metal article are worked.

47. A method of making a brazed joint, the method comprising carrying out the method of claim 29, placing the composite material in direct contact with another metal or metal alloy piece and heating the joint in the absence of added flux.

48. A brazed joint between two pieces, the brazed joint having been formed by carrying out the method according to claim 29, placing the composite material in direct contact with a metal or metal alloy piece, and heating the joint in the absence of added flux.

49. A method as claimed in claim 29, wherein the piece is worked.

50. A method of making a brazed joint, the method comprising placing the composite material part as claimed in claim 1, in direct contact with another metal or metal alloy piece and heating the joint in the absence of added flux.

51. A method as claimed in claim 50, wherein the composite material is worked after being made and before being placed in contact with the other metal or metal alloy piece.

52. A heat exchanger including a brazed joint according to claim 48.

53. A self-fluxing composite material comprising:
a continuous, non-particulate matrix having a composition including an aluminum-based metal or metal alloy; and
at least one inorganic salt distributed as particles in the matrix,
wherein sizes of the particles of the least one inorganic salt have a bi-modal distribution with a first mode at a first particle size of less than 1 micron and a second mode at a second particle size that is more coarse than the first particle size, and
wherein said at least one inorganic salt forms a flux during brazing to promote the formation of a thermally induced metallic bond.

54. The self-fluxing composite material of claim 53, wherein the composite contains less than 1000 ppm by weight oxygen.

55. The self-fluxing composite material as claimed in claim 53, wherein the oxygen content of the matrix is no more than 350 ppm by weight.

56. The self-fluxing composite material of claim 53, wherein a microstructure of the matrix has no interconnected porosity pathways for oxidation of said at least one inorganic salt by air or oxygen ingress.

57. The self-fluxing composite material as claimed in claim 53, wherein the composition of the matrix includes 5 to 15 wt % silicon.

58. The self-fluxing composite material as claimed in claim 53, wherein the at least one inorganic salt is a potassium-aluminium-fluoride flux or is two or more inorganic materials which during brazing form a potassium-aluminium-fluoride flux.

59. The self-fluxing composite material as claimed in claim 53, wherein the at least one inorganic salt is a potassium-fluoro-aluminate flux is or two or more inorganic materials which during brazing form a potassium-fluoro-aluminate flux.

60. The self-fluxing spray-formed composite material as claimed in claim 53, wherein a content of the at least one inorganic material is 0.2-10 wt %.

61. The self-fluxing spray-formed composite material as claimed in claim 60, wherein the content of the at least one inorganic material is greater than 1.1 wt % and a melt activity ratio is greater than 1.

62. A component comprising a metal article and the self-fluxing composite material as claimed in claim 53 attached to the metal article.

63. The component as claimed in claim 62, wherein the self-fluxing composite material is roll bonded on to the metal article.

64. The component as claimed in claim 62, further comprising a second self-fluxing composite material, wherein the first and second self-fluxing spray-formed composite materials are attached to the metal article on opposite sides thereof.

65. The component as claimed in claim 62, wherein the component is a component to be connected by brazing in a heat exchanger.

66. The component as claimed in claim 62, wherein the component is one of a fin, plate or tube to be brazed in place in a heat exchanger.

67. A brazed joint between two parts, the brazed joint having been formed by placing the self-fluxing composite material according to claim 53 in direct contact with another metal or metal alloy part and heating the joint in the absence of added flux.

68. A heat exchanger including a brazed joint according to claim 67.

69. A self-fluxing composite material formed by spray forming using a molten metal source, comprising:
a continuous, non-particulate matrix having a composition including an aluminum-based metal or metal alloy; and
at least one inorganic salt distributed as particles in the matrix,
wherein the composite material has an inter-particle spacing between adjacent particles of the at least one inorganic salt that is less than 5 microns, and
wherein said at least one inorganic salt forms a flux during brazing to promote the formation of a thermally induced metallic bond.

70. The self-fluxing composite material of claim 69, wherein sizes of the particles of the least one inorganic salt have a bi-modal distribution with a first mode at a first particle size of less than 1 micron and a second mode at a second particle size that is more coarse than the first particle size.

71. The self-fluxing composite material of claim 69, wherein a microstructure of the matrix has no interconnected porosity pathways for oxidation of said at least one inorganic salt by air or oxygen ingress.

72. The self-fluxing composite material of claim 69, wherein the composite contains less than 1000 ppm by weight oxygen.

73. The self-fluxing composite material as claimed in claim 69, wherein the oxygen content of the matrix is no more than 350 ppm by weight.

74. The self-fluxing composite material as claimed in claim 69, wherein the composition of the matrix includes 5 to 15 wt % silicon.

75. The self-fluxing spray-formed composite material as claimed in claim 74, wherein the content of the at least one inorganic material is greater than 1.1 wt % and a melt activity ratio is greater than 1.

76. The self-fluxing composite material as claimed in claim 69, wherein the at least one inorganic salt is a potassium-aluminium-fluoride flux or is two or more inorganic materials which during brazing form a potassium-aluminium-fluoride flux.

77. The self-fluxing composite material as claimed in claim 69, wherein the at least one inorganic salt is a potassium-fluoro-aluminate flux is or two or more inorganic materials which during brazing form a potassium-fluoro-aluminate flux.

78. The self-fluxing spray-formed composite material as claimed in claim 69, wherein a content of the at least one inorganic material is 0.2-10 wt %.

79. A component comprising a metal article and the self-fluxing composite material as claimed in claim 69 attached to the metal article.

80. The component as claimed in claim 79, wherein the self-fluxing composite material is roll bonded on to the metal article.

81. The component as claimed in claim 79, further comprising a second self-fluxing composite material, wherein the first and second self-fluxing spray-formed composite materials are attached to the metal article on opposite sides thereof.

82. The component as claimed in claim 79, wherein the component is a component to be connected by brazing in a heat exchanger.

83. The component as claimed in claim 79, wherein the component is one of a fin, plate or tube to be brazed in place in a heat exchanger.

84. A brazed joint between two parts, the brazed joint having been formed by placing the self-fluxing composite material according to claim 69 in direct contact with another metal or metal alloy part and heating the joint in the absence of added flux.

85. A heat exchanger including a brazed joint according to claim 84.

86. A self-fluxing composite material, comprising:
a continuous, non-particulate matrix having a composition including an aluminum-based metal or metal alloy; and
at least one inorganic salt distributed as particles in the matrix,
wherein the composite contains less than 1000 ppm by weight oxygen and a microstructure of the matrix has no interconnected porosity pathways for oxidation of said at least one inorganic salt by air or oxygen ingress,
wherein the composite material has an inter-particle spacing between adjacent particles of the at least one inorganic salt that is less than 5 microns,
wherein sizes of the particles of the least one inorganic salt have a bi-modal distribution with a first mode at a first particle size of less than 1 micron and a second mode at a second particle size that is more coarse than the first particle size, and
wherein said at least one inorganic salt is capable of forming a flux during brazing to promote the formation of a thermally induced metallic bond.

87. A billet, comprising:
a matrix having a composition including an aluminum-based metal or metal alloy and a microstructure that is continuous and non-particulate; and
at least one inorganic salt distributed as particles in the matrix,
wherein the composite contains less than 1000 ppm by weight oxygen,
wherein the microstructure of the matrix has no interconnected porosity pathways for oxidation of said at least one inorganic salt by air or oxygen ingress, and
wherein said at least one inorganic salt is capable of forming a flux during brazing to promote the formation of a thermally induced metallic bond.

88. The billet of claim 87, wherein sizes of the particles of the least one inorganic salt are characterized by a bi-modal distribution with a first mode at a first particle size of less than 1 micron including particles down to at least 0.1 microns in size, and a second mode at a second particle size that is up to at least 200 microns.

89. The billet of claim 87, wherein all the inorganic salt exists as a non-macrosegregated solidified phase.

90. A self-fluxing composite material, comprising:
a continuous, non-particulate matrix having a composition including an aluminum-based metal or metal alloy; and
at least one inorganic salt distributed as particles in the matrix,
wherein sizes of the particles of the least one inorganic salt are less than one micron and down to at least 0.1 microns, and
wherein said at least one inorganic salt is capable of forming a flux during brazing to promote the formation of a thermally induced metallic bond.

\* \* \* \* \*